US012792610B2

(12) United States Patent
Gutkowski et al.

(10) Patent No.: US 12,792,610 B2
(45) Date of Patent: Nov. 10, 2026

(54) HIGH PERFORMANCE DATA FILTERING

(71) Applicant: Dynatrace LLC, Waltham, MA (US)

(72) Inventors: Pawel Gutkowski, Gdansk (PL); Tomasz Wozniak, Gdansk (PL); Pawel Pszczolinski, Gdansk (PL)

(73) Assignee: Dynatrace LLC, Boston, MA (US)

( * ) Notice: Subject to any disclaimer, the term of this patent is extended or adjusted under 35 U.S.C. 154(b) by 0 days.

(21) Appl. No.: 18/746,558

(22) Filed: Jun. 18, 2024

(65) Prior Publication Data

US 2025/0036631 A1 Jan. 30, 2025

Related U.S. Application Data

(60) Provisional application No. 63/528,998, filed on Jul. 26, 2023.

(51) Int. Cl.
*G06F 16/2455* (2019.01)

(52) U.S. Cl.
CPC .............................. *G06F 16/24564* (2019.01)

(58) Field of Classification Search
CPC ..................... G06F 16/24564; G06F 16/24568
See application file for complete search history.

(56) References Cited

U.S. PATENT DOCUMENTS 8,160,092 B1 4/2012 Attig et al.
2013/0085977 A1 4/2013 Junker
2014/0156823 A1* 6/2014 Liu ......................... H04L 41/20 709/223
2017/0116292 A1* 4/2017 Boehme ............ G06F 16/24537
2018/0276278 A1* 9/2018 Cagan ................. G06F 16/9024
2022/0197910 A1* 6/2022 Gladwin ............. G06F 16/2428
2024/0168950 A1* 5/2024 Cruanes ............ G06F 16/24542

FOREIGN PATENT DOCUMENTS

CN 103827853 B 2/2017

* cited by examiner

*Primary Examiner* — Aleksandr Kerzhner
*Assistant Examiner* — Aryan D Toughiry
(74) *Attorney, Agent, or Firm* — Harness, Dickey & Pierce, P.L.C.

(57) ABSTRACT

A computer-implemented method is presented for filtering a data record against a set of pre-defined rules. The method includes: receiving a set of pre-defined rules, where each rule in the set of pre-defined rules includes one or more conditions and an action taken when the one or more conditions are satisfied; enumerating conditions in the set of pre-defined rules for form an ordered list of conditions; removing select conditions from the ordered list of conditions, where each of the select conditions has an identical condition preceding it in the ordered list of conditions; for each given rule in the set of pre-defined rules, connecting conditions in the ordered list of conditions that are associated with a given rule by logical operators to form a transformed rule corresponding to the given rule in the set of pre-defined rules, thereby forming a set of transformed rules.

16 Claims, 12 Drawing Sheets

HIGH PERFORMANCE DATA FILTERING

CROSS-REFERENCE TO RELATED APPLICATIONS

This application claims the benefit of U.S. Provisional Application No. 63/528,998, filed on Jul. 26, 2023. The entire disclosure of the above application is incorporated herein by reference.

FIELD

The disclosure concerns the field of information technology. In particular, the disclosure concerns the filtering of input data records against a list of predefined rules. Each input data record comprises multiple data fields. In this document the rules are also referred to as matcher queries. In case an input data record fulfills a rule's condition or matcher query, the action associated to that rule is executed. In some cases, the action does not modify the input data record; in other cases, the input data record is modified.

BACKGROUND

In prior art solutions, the filtering of input data records is performed sequentially, e.g. one rule, then the next rule etc. In other words, an input data record is sequentially matched with all rules in the list of predefined filter rules. In case the matcher query belonging to a rule is fulfilled then the action associated with that rule is executed. Otherwise, the action associated with that rule is not executed. Subsequently the next rule is processed until all rules are processed. After having processed all rules, the next input data record is filtered.

Figure 1:
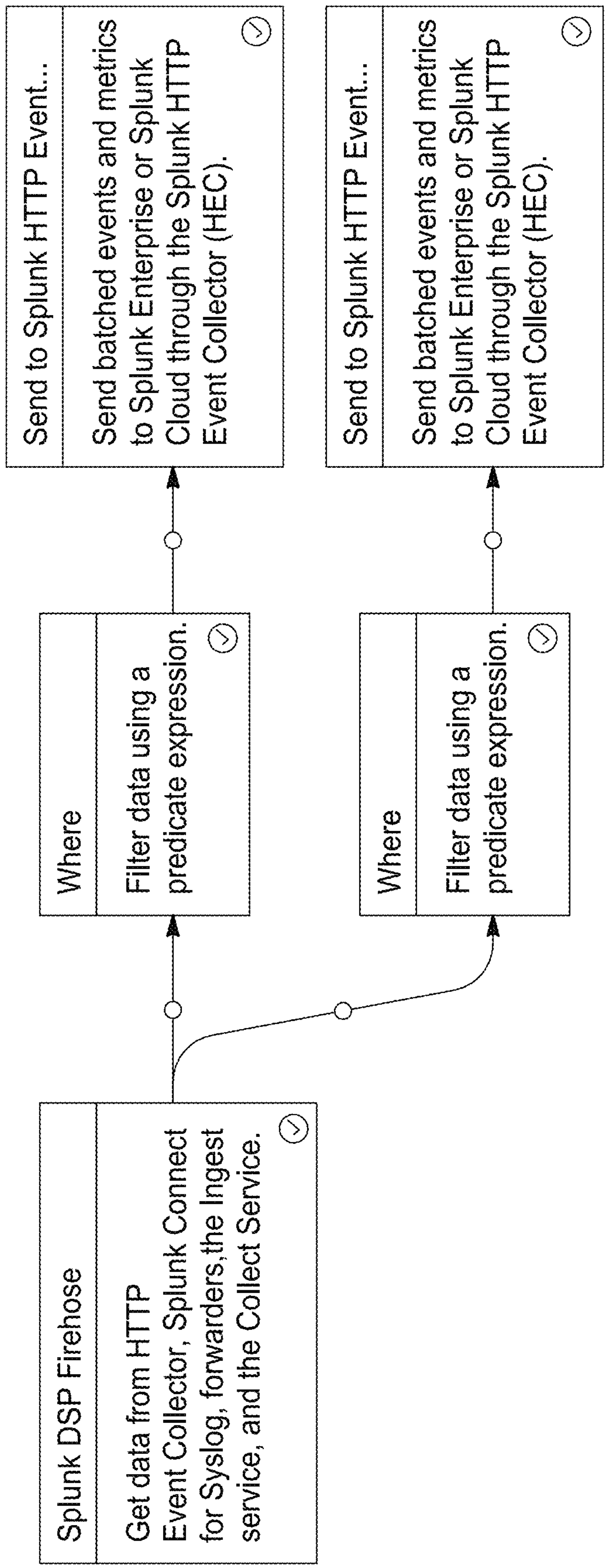
Fig. 1 Prior art

Examples of prior art solutions are the SPLUNK Data Stream Processor (https://docs.splunk.com/Documentation/DSP/1.4.0/User/Filter, see FIG. 1) and the CRIBL Stream (https://docs.cribl.io/stream/basic-concepts, see FIG. 2): In these solutions, the data is filtered and transferred to the next stages of processing, where data can, for example, be modified or saved to different destinations. It is worth noting that in this case, the modifications are not visible at the filtering stage, as a result, if selected data records shall be enriched with dictionary data and then select the destination based on the added fields, it is not possible to do it in one filtering step. In order to achieve this, the procedure has to be broken down into two separate filtering stages, which incurs additional processing costs. In the existing solutions, the filtering and data modification stages are two independent stages. The existing solutions focus directly on matching subsequent records from the set to subsequent defined filters, the processing is iterative, and if a record is matched to the selected filter, such a record is accepted for the next stage of processing.

In the SPLUNK Data Stream Processor of FIG. 1 an input data record, named "Splunk DSP Firehose", is filtered by two rules, titled "Where". In case the condition of a rule is fulfilled, an action "Send to Splunk HTTP Event . . . " is executed.

Figure 2:
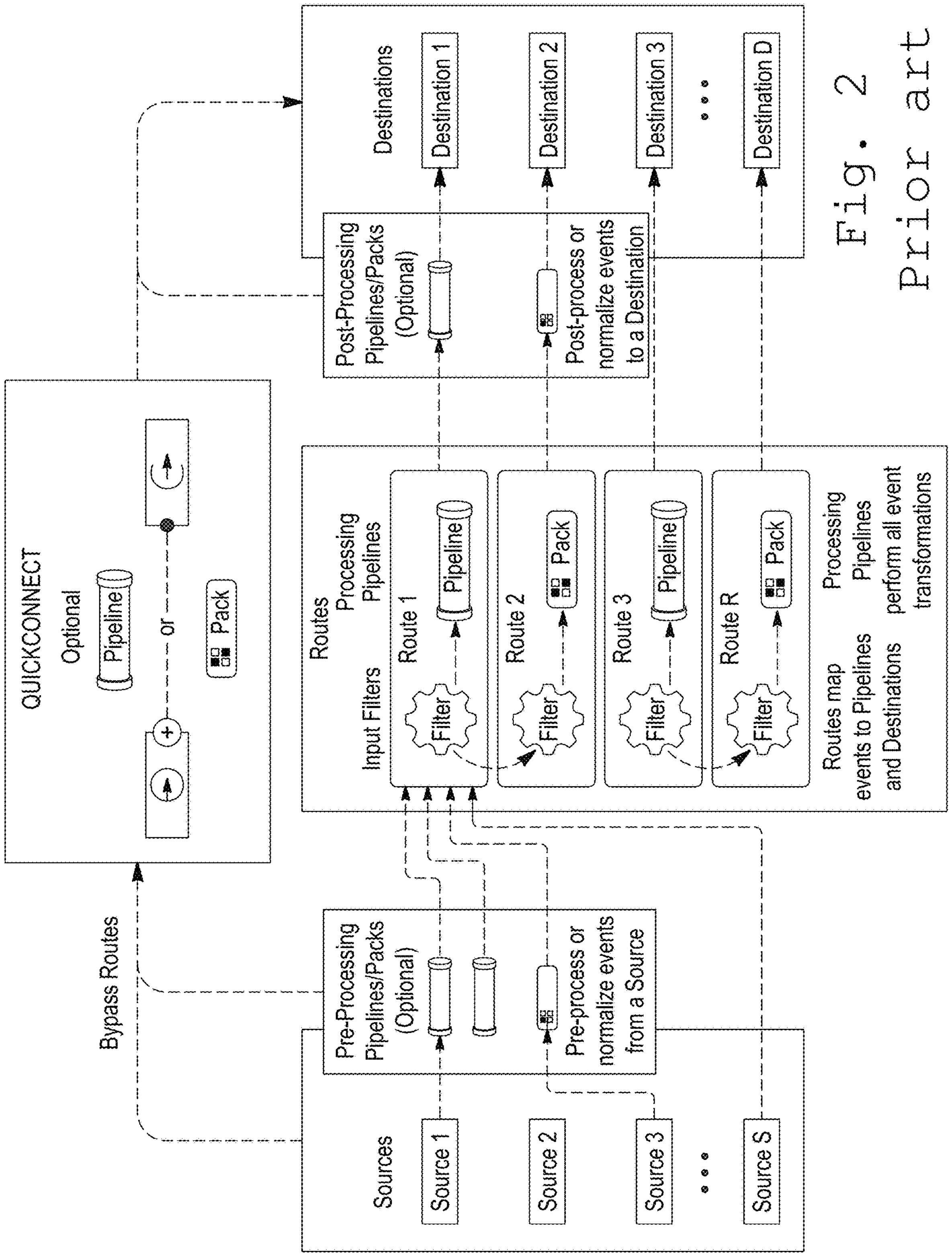
Fig. 2 Prior art

Likewise in the CRIBL Stream of FIG. 2, no extraction of conditions or Boolean operators takes place. Depending on a data source comprising multiple data fields, all the rules are processed sequentially.

The prior art is also described in U.S. Pat. No. 10,896,175 B2, where it is stated that "The modification to the first data processing pipeline can include a first set of pipelined commands corresponding to the first search query being modified, and the dependency can be enforced by causing a second set of pipelined commands corresponding to the second search query to be modified to include the modified first set of pipelined commands." It should be noted that the patent describes a solution that works when reading data, not when ingesting data.

Another prior art solution for rule-based data stream processing is described in US 202/20121689 A1, which states that "Systems and methods for rule-based data stream processing by data collection, indexing, and visualization systems. An example method includes: receiving, by the computer system, an input data stream comprising raw machine data; processing the raw machine data by a data processing pipeline that produces transformed machine data". It should be noted that the patent describes a solution of data processing based on pipeline stages, not data matching solution.

This section provides background information related to the present disclosure which is not necessarily prior art.

SUMMARY

This section provides a general summary of the disclosure, and is not a comprehensive disclosure of its full scope or all of its features.

The object of the disclosure is to find a new computer-implemented method for the filtering of input data records against an ordered list of pre-defined rules. The method shall be computationally more efficient than prior art solutions in cases the filtering modifies or does not modify the input data record. In case the filtering modifies the input data record, filtering and modifying the input data record shall be done in a single processing step. In other words, separate processing steps for filtering and modifying the input data record shall be avoided.

According to a first aspect of the disclosure, the objective is solved by a computer-implemented method for filtering an input data record against an ordered list of pre-defined rules according to claim 1.

In particular, the computer-implemented method comprises the following steps:

- transforming each rule in the list of pre-defined rules into a transformed rule, wherein the transformed rule comprises
  - a number of unique, univariate conditions such that each univariate condition depends on a single data field only, and
  - a number of logical operators, including Boolean operators and the Identity operator, operating on the number of unique, univariate conditions such that the transformed rule is logically identical to the original rule;
- defining an ordered list of unique, univariate conditions by discarding multiple instances of identical conditions;
- preferably grouping the ordered list of unique, univariate conditions by data field;
- evaluating the statuses of the conditions contained in the ordered list of conditions by matching the input data record to the conditions;
- filtering the input data record by sequentially processing the transformed rules in ascending order,
- if the status of a transformed rule is TRUE, executing the action associated with that rule, and
- continue the evaluation with the next rule.

The disclosed method comprises two phases, first a pre-processing phase followed by a matching phase. In the pre-processing phase, each rule in the list of pre-defined rules is pre-processed into a number of unique, univariate conditions and a number of logical operators operating on the unique, univariate conditions. A unique, univariate condition depends on a single data field only. By pre-processing each rule, at least one unique, univariate condition is derived. In addition to the at least one unique, univariate condition, a number of logical operators, including Boolean operators, such as AND, OR, NOT . . . , and the Identity operator, operating on the number of unique, univariate conditions are derived from the rule. Formally the identity operator implements the Identity function f for all X, such that $f(X)=X$. In terms of Boolean logics, each transformed rule consisting of logical operator(s) operating on at least one unique, univariate condition is logically equivalent to the original rule. In most cases, some conditions are present in multiple rules. In order to minimize the number of unique, univariate conditions for all rules, multiple instances of identical conditions are discarded, hereby defining an ordered list of unique, univariate conditions with minimal length. After that, preferably the conditions in the list are grouped by the data field accessed in the input data record. The data field is the field on which the univariate condition depends on. Essentially, in the pre-processing phase, the disclosed method derives an ordered list of data fields, an ordered list of unique, univariate conditions, and a set of logical operators operating on the unique, univariate conditions.

In the matching phase of the disclosed method, the input data records are sequentially processed. Starting with the first input data record, the statuses of the conditions is derived by matching the data fields in the input data record to the list of unique, univariate conditions. Next, the input data record is filtered by sequentially applying the at least one logical operator of a transformed rule to the unique, univariate conditions. By evaluation the statuses of the conditions and by applying the logical operators belonging to a transformed rule, the status of the transformed rule is evaluated. The processing of rules is done in ascending order, however, in some cases not all rules need to be processed. Note that a condition being present in multiple rules is only evaluated once and the status of a condition is re-used when processing other rules. In case the status of a transformed rule is TRUE, i.e. the input data record fulfills the requirements of the matcher query then the respective action associated with that rule is executed. Otherwise, no action is executed. After processing all rules, the next input data record is filtered.

According to a preferred embodiment of the disclosure, the logical operators for all transformed rules comprise positive operators only, i.e. do not comprise a NOT operator. By doing so, it is possible to compile a total set of pre-selected rules, such that only those rules comprised in this set are evaluated. In the prior art, always all rules need to be evaluated.

In another preferred embodiment, after evaluating the conditions, for each condition having a TRUE status a set of pre-selected rules is compiled. The set of pre-selected rules comprises those transformed rules where the status of the condition is evaluated.

It is particularly advantageous to compile a total set of pre-selected rules for all conditions having a TRUE status, and to process only the transformed rules comprised in the total set of pre-selected rules. This allows to minimize the number of rules to be evaluated. If based on the conditions having a TRUE status, certain rules are not comprised in the total set of pre-selected rules then those rules will not be evaluated at all.

According to another preferred embodiment, after an action associated with a rule modifies a data field in the input data record, only those conditions are re-evaluated than depend on the modified data field. This feature is extremely helpful since not all rules or not even all conditions are re-evaluated but only those conditions that depend on the modified data field in the input data record. This feature allows to filter and modify the input data record in a single step, thereby avoiding the at least two processing stages of the prior art.

It is preferred to repeat the steps

- transforming each rule in the list of pre-defined rules into a transformed rule, wherein the transformed rule comprises
  - a number of unique, univariate conditions such that each univariate condition depends on a single data field only, and
  - a number of logical operators, including Boolean operators and the Identity operator, operating on the number of unique, univariate conditions such that the transformed rule is logically identical to the original rule;
- defining an ordered list of unique, univariate conditions by discarding multiple instances of identical conditions; and
- preferably grouping the ordered list of unique, univariate conditions by data field;

after modifying at least one rule in the set of pre-defined rules. In other words, the pre-processing steps are repeated if at least one rule is changed.

Further areas of applicability will become apparent from the description provided herein. The description and specific examples in this summary are intended for purposes of illustration only and are not intended to limit the scope of the present disclosure.

DRAWINGS

Figure 3:
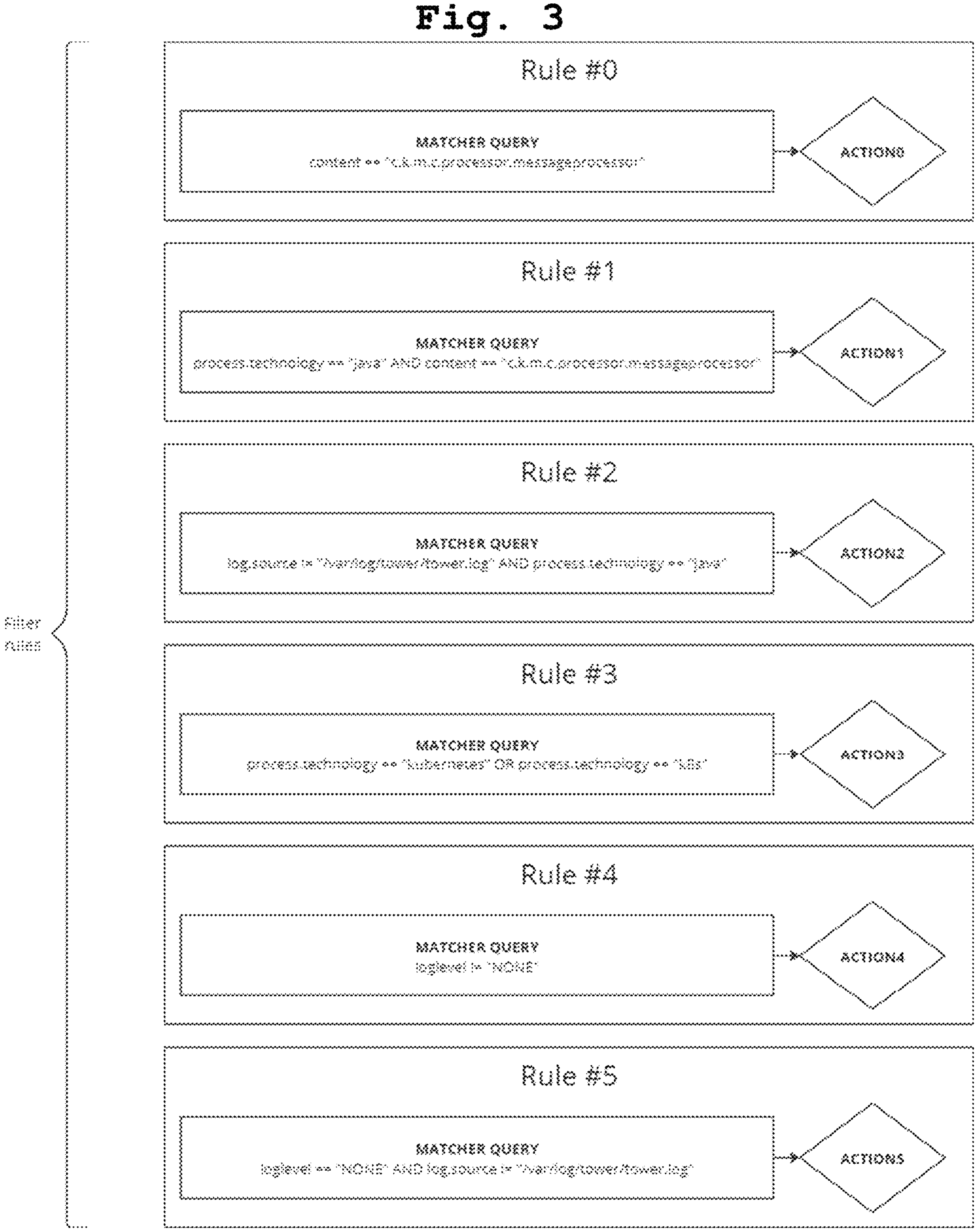
Figure 4:
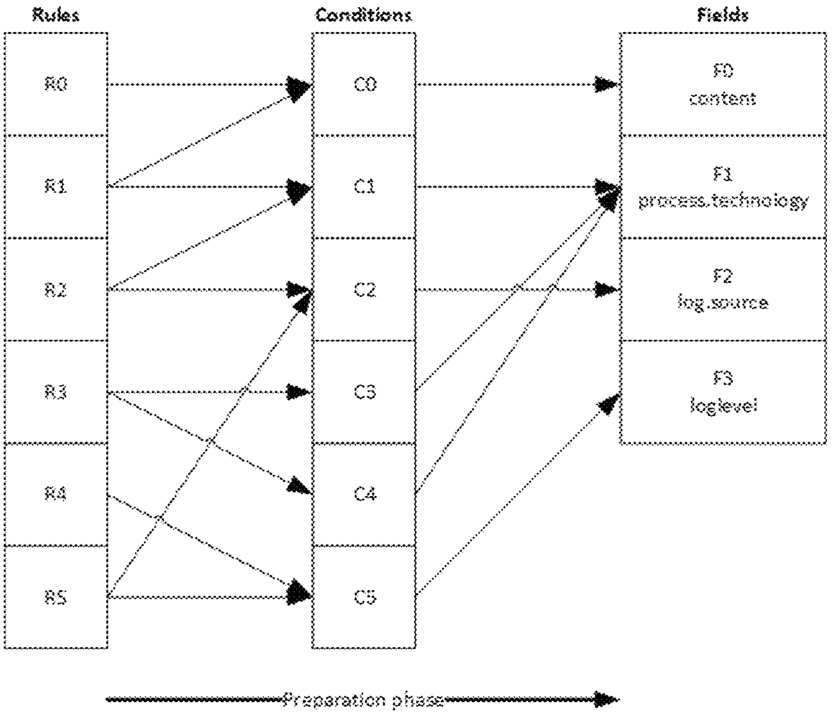
Figure 5:
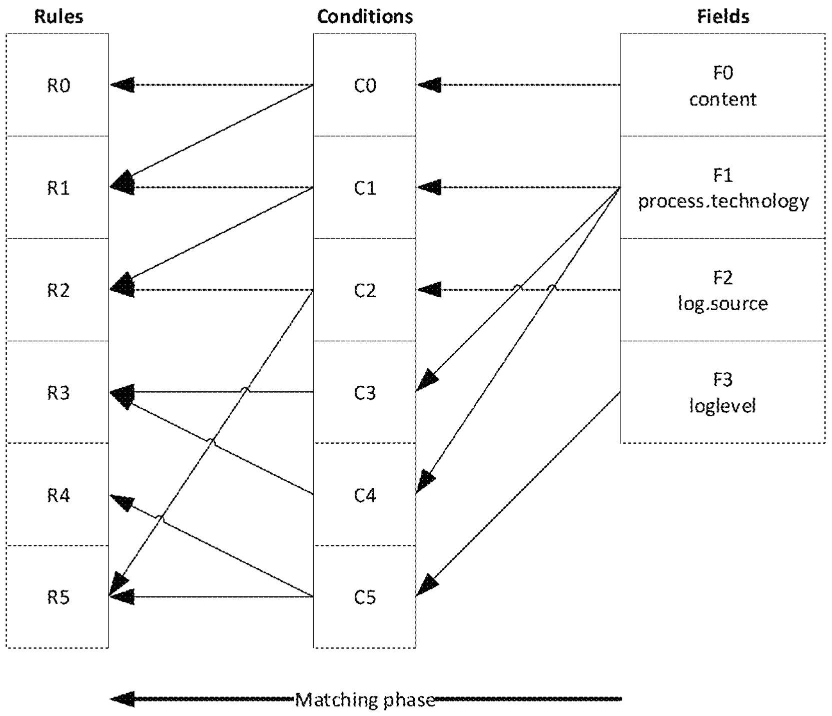
Figure 6:
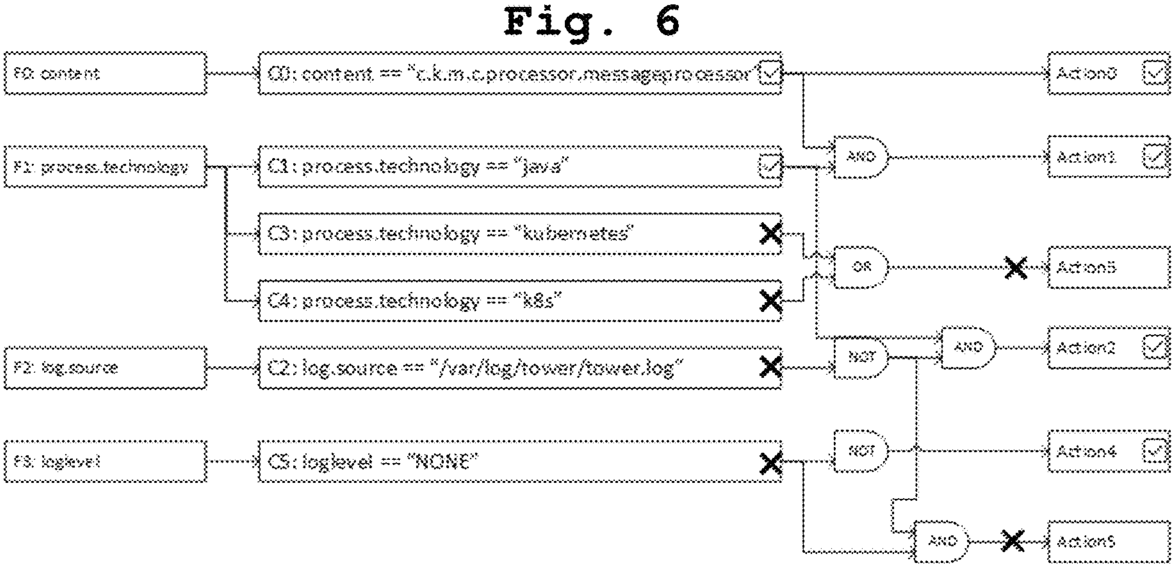
Figure 8A:
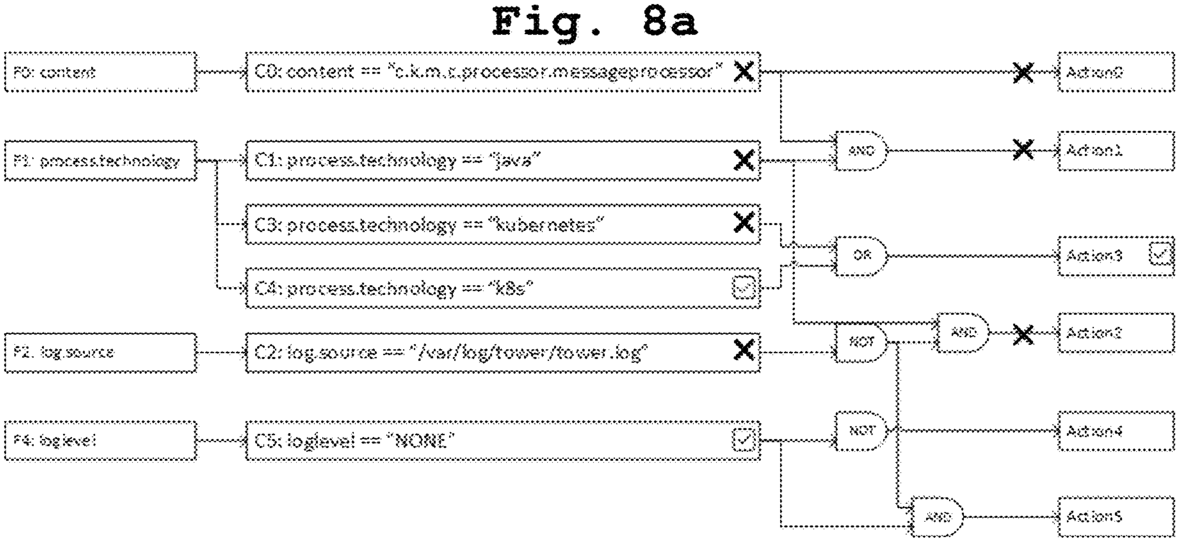
Figure 8B:
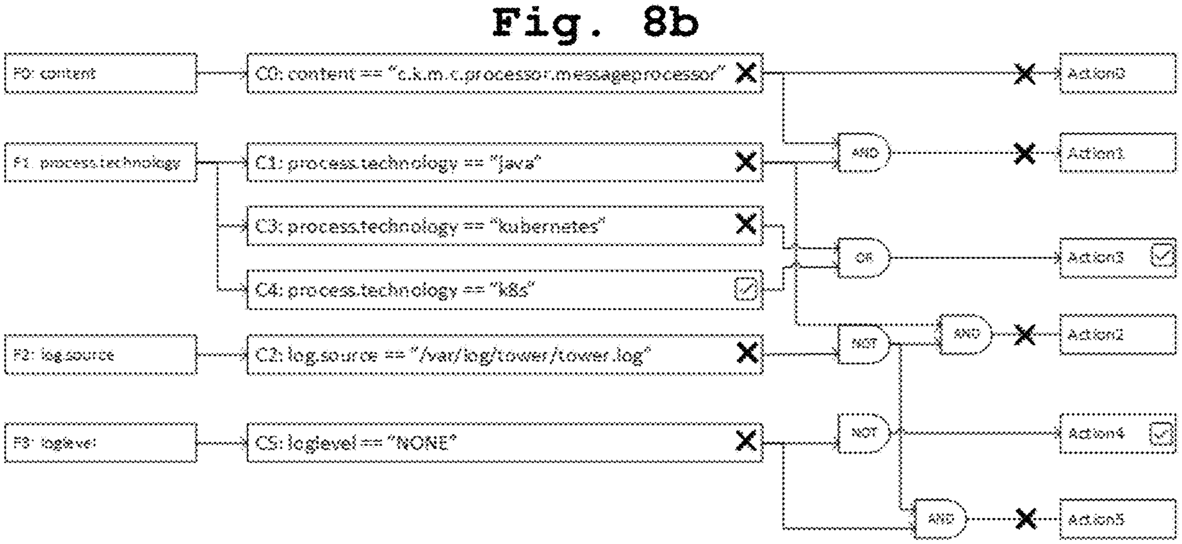
Figure 7:
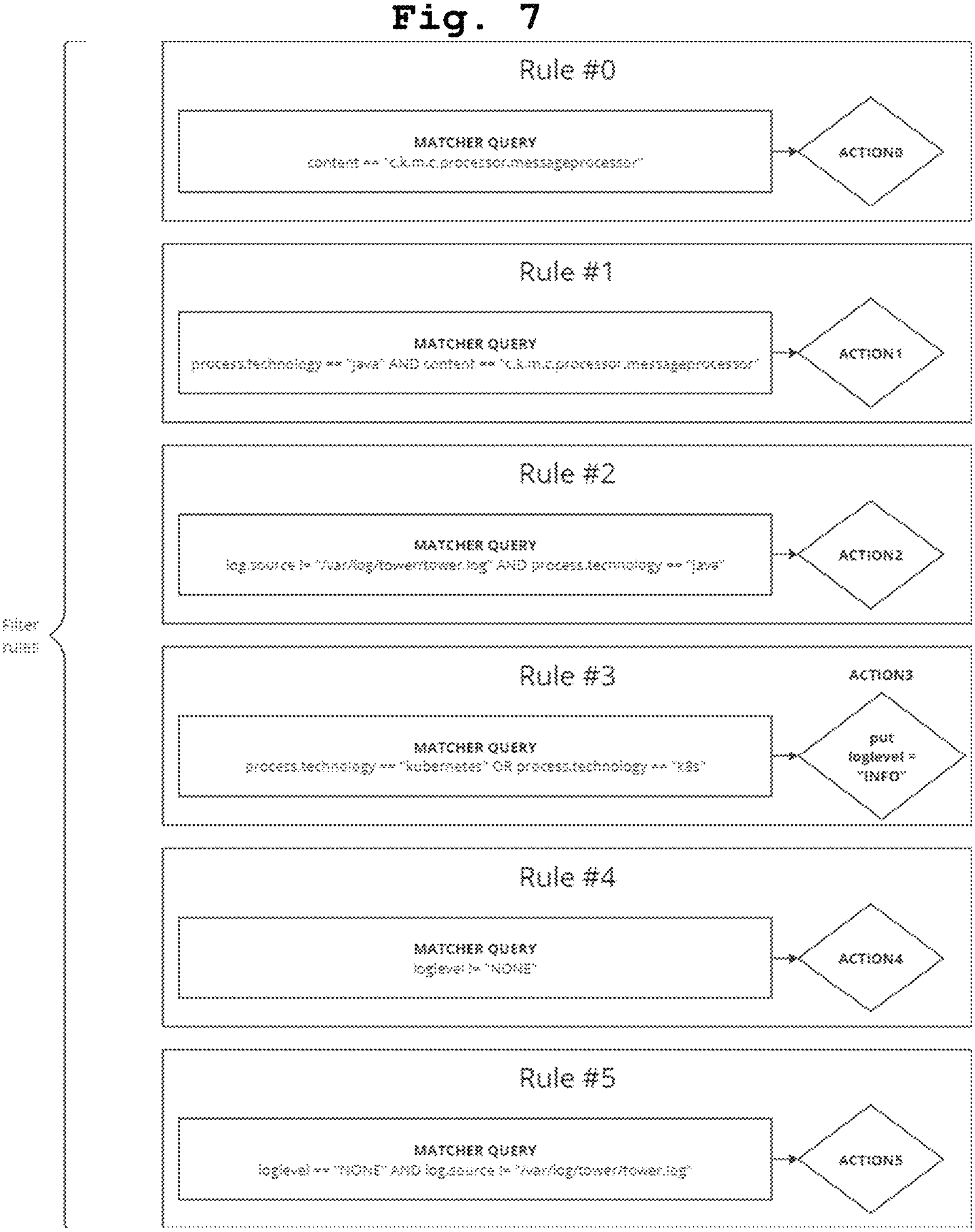
Figure 9:
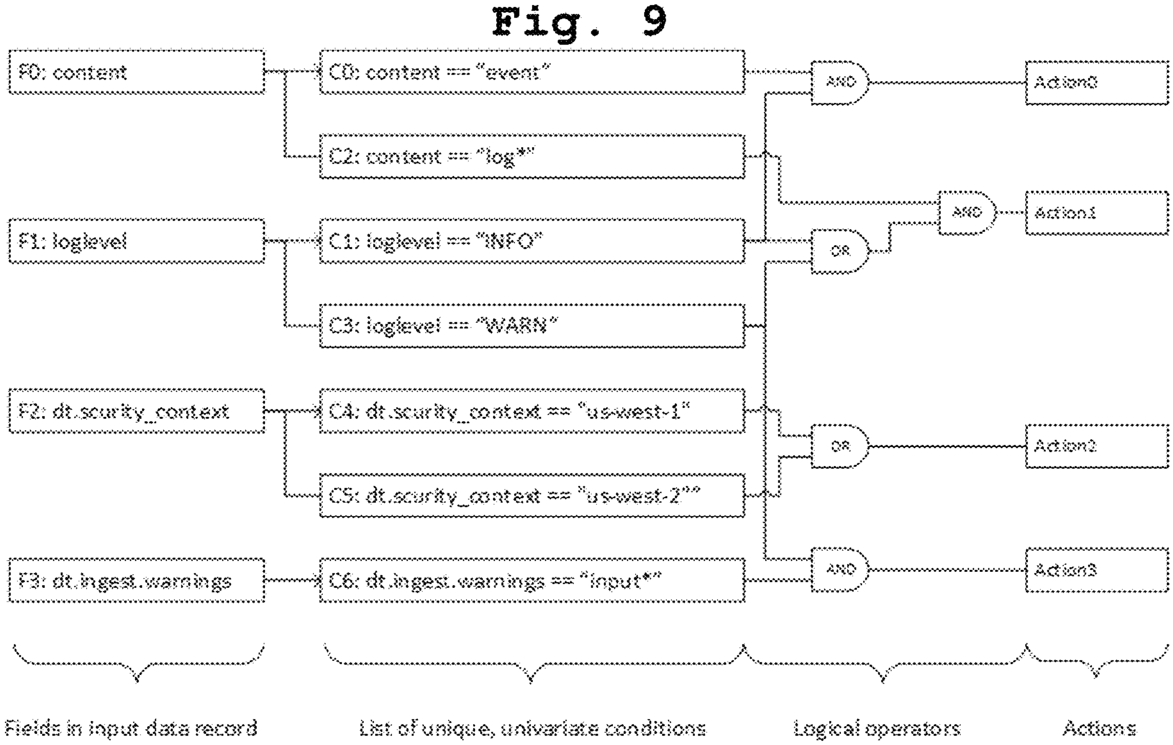
Figure 10:
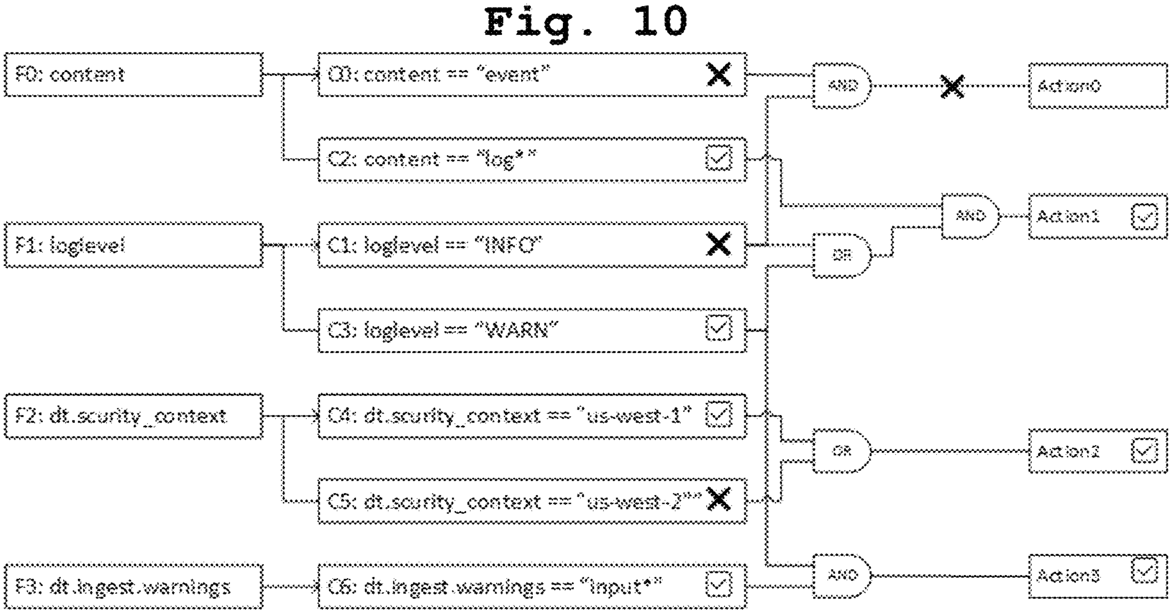
Figure 11:
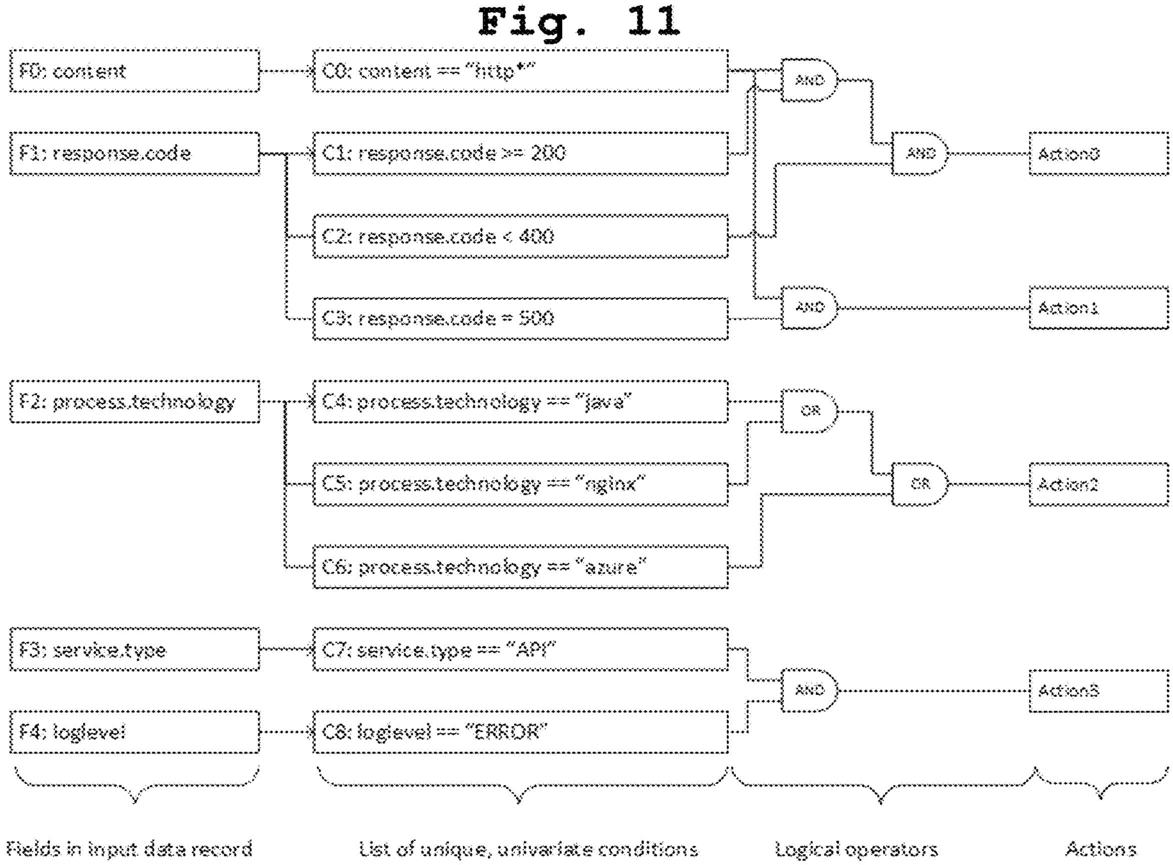
Figure 12:
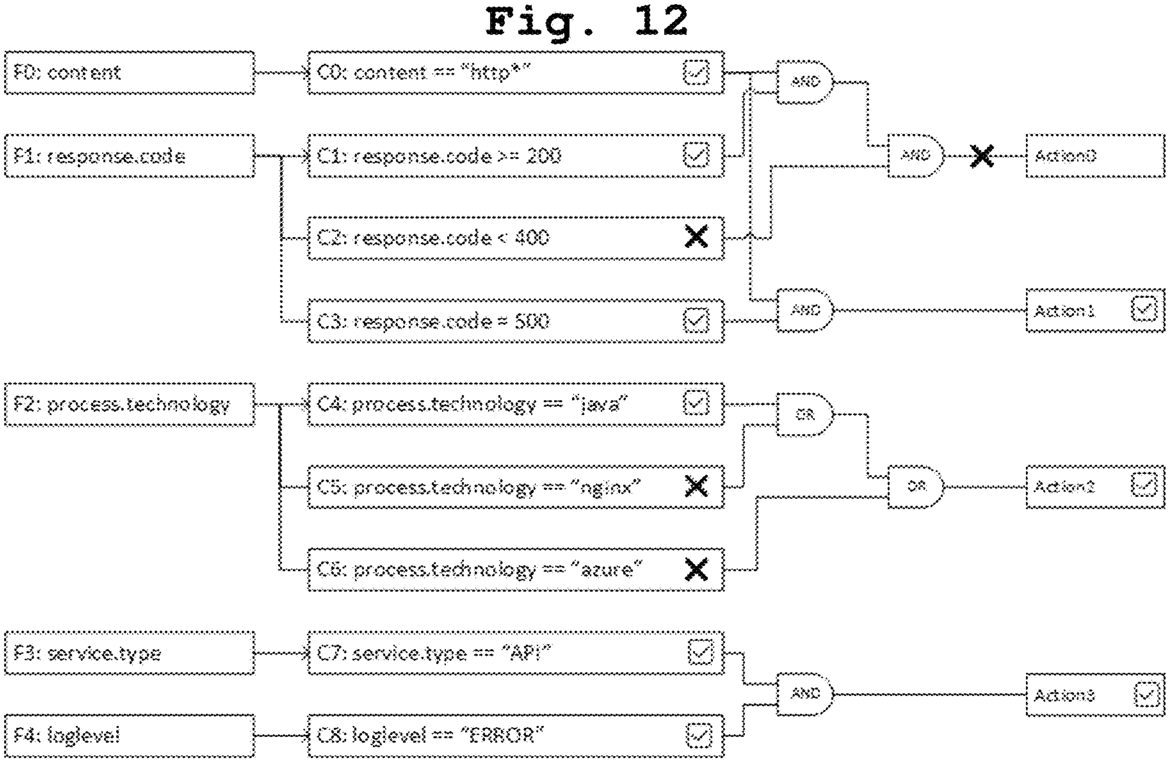
Figure 13:
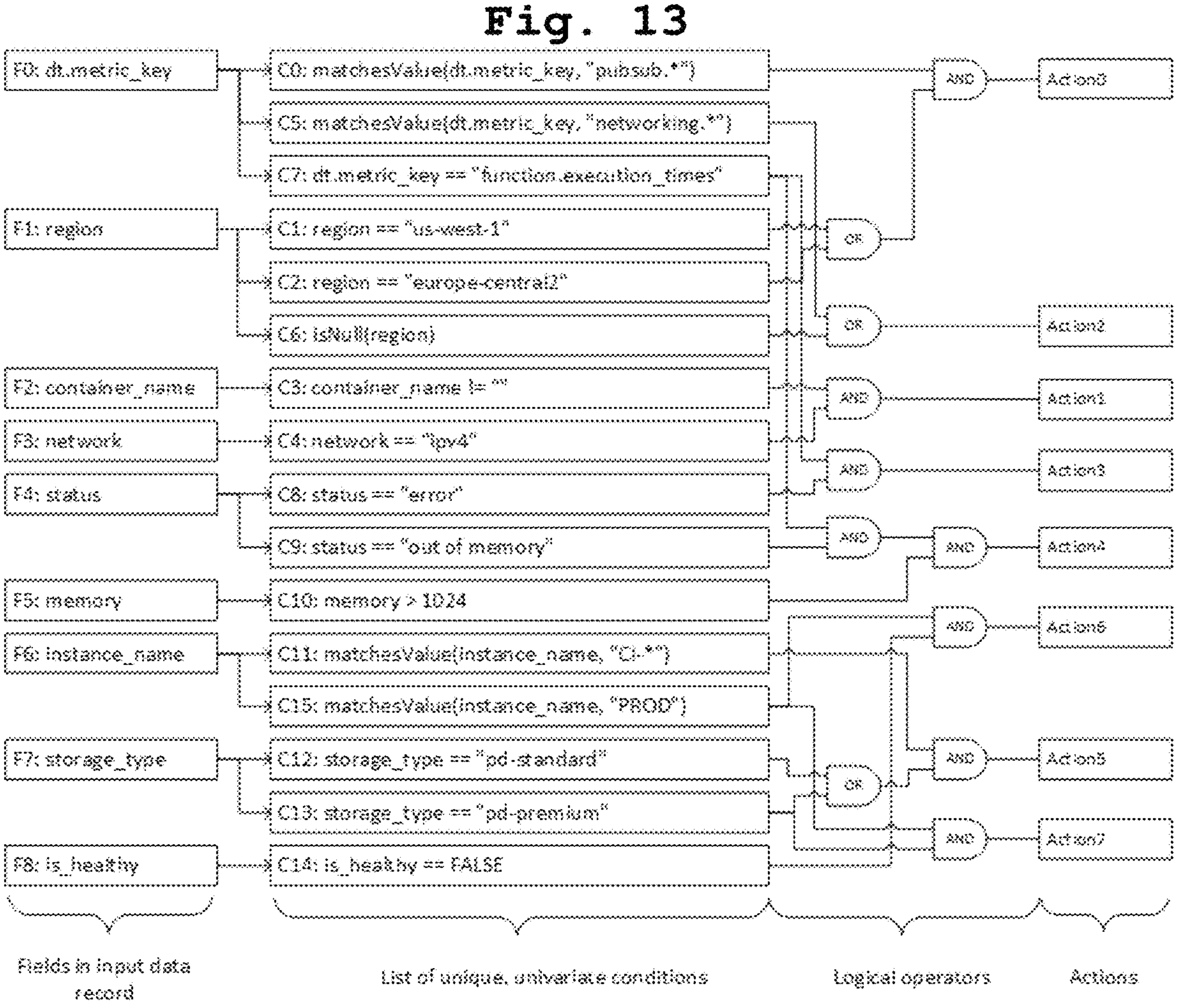
Figure 14:
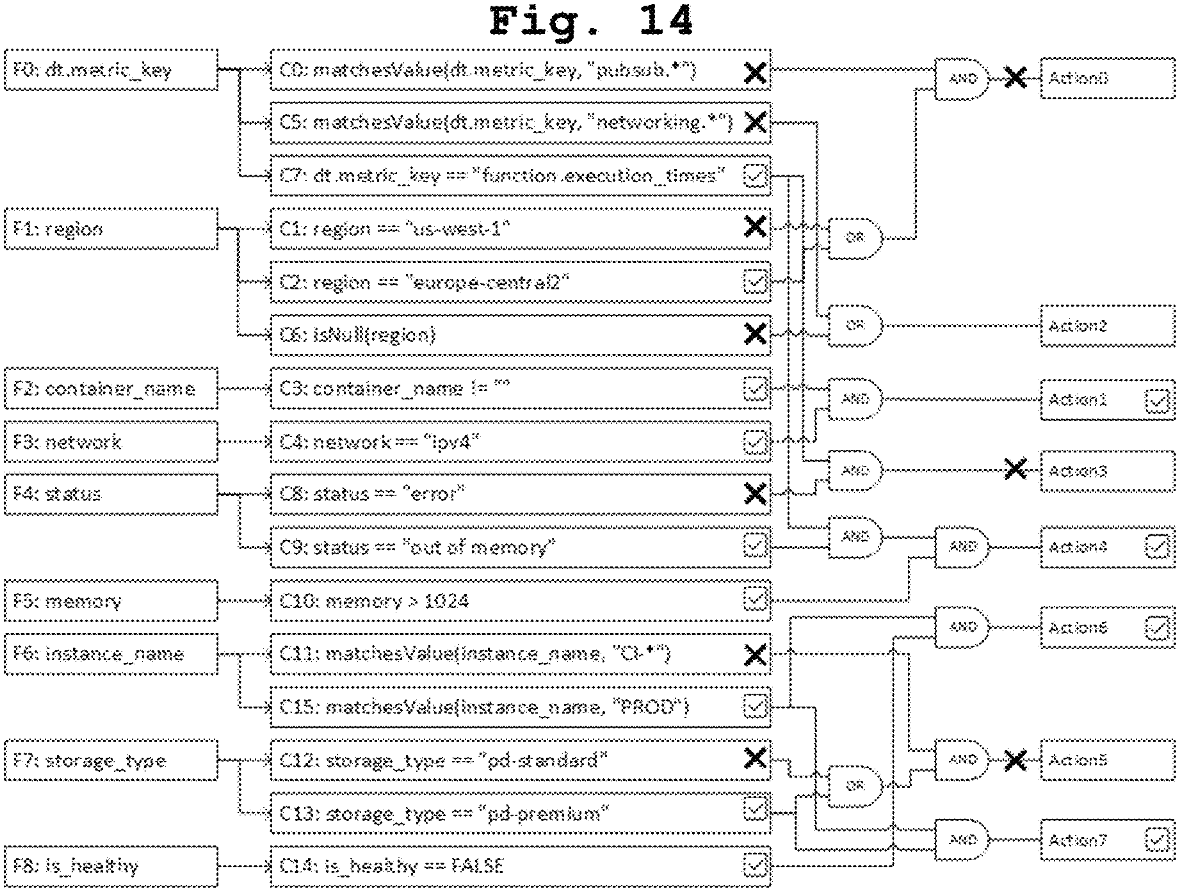
Figure 15:
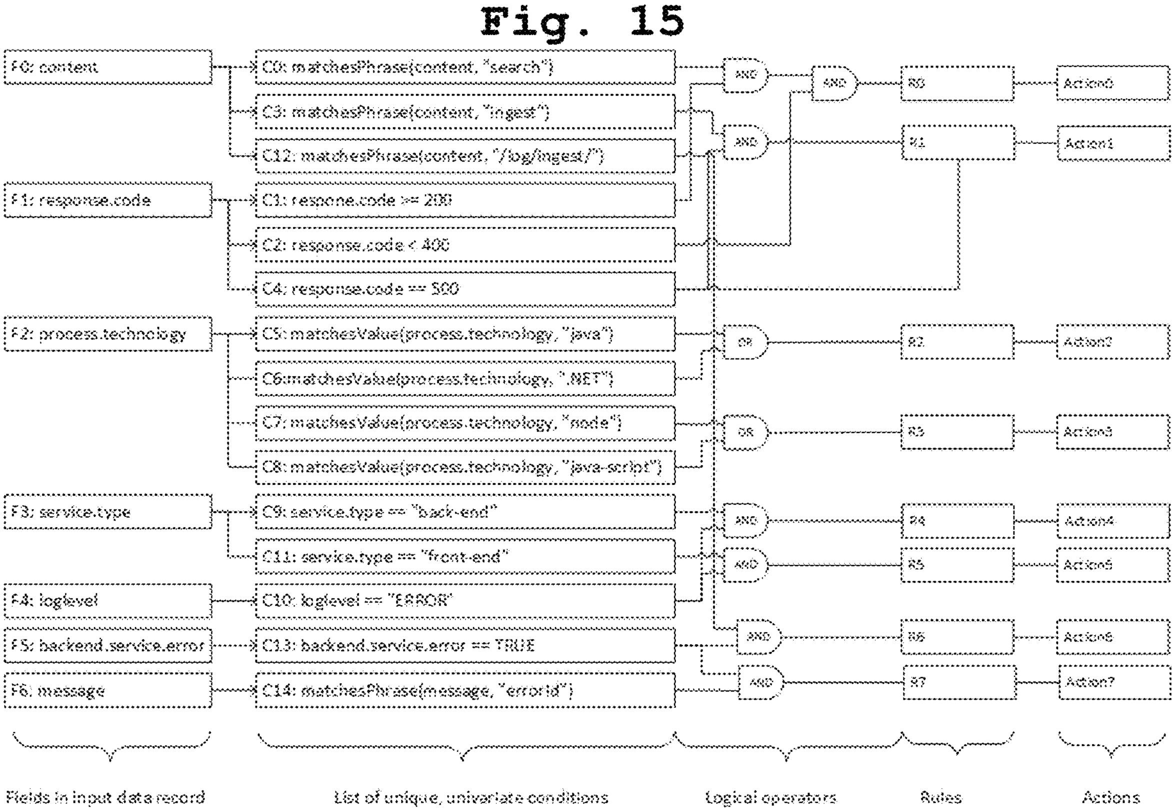
Figure 16:
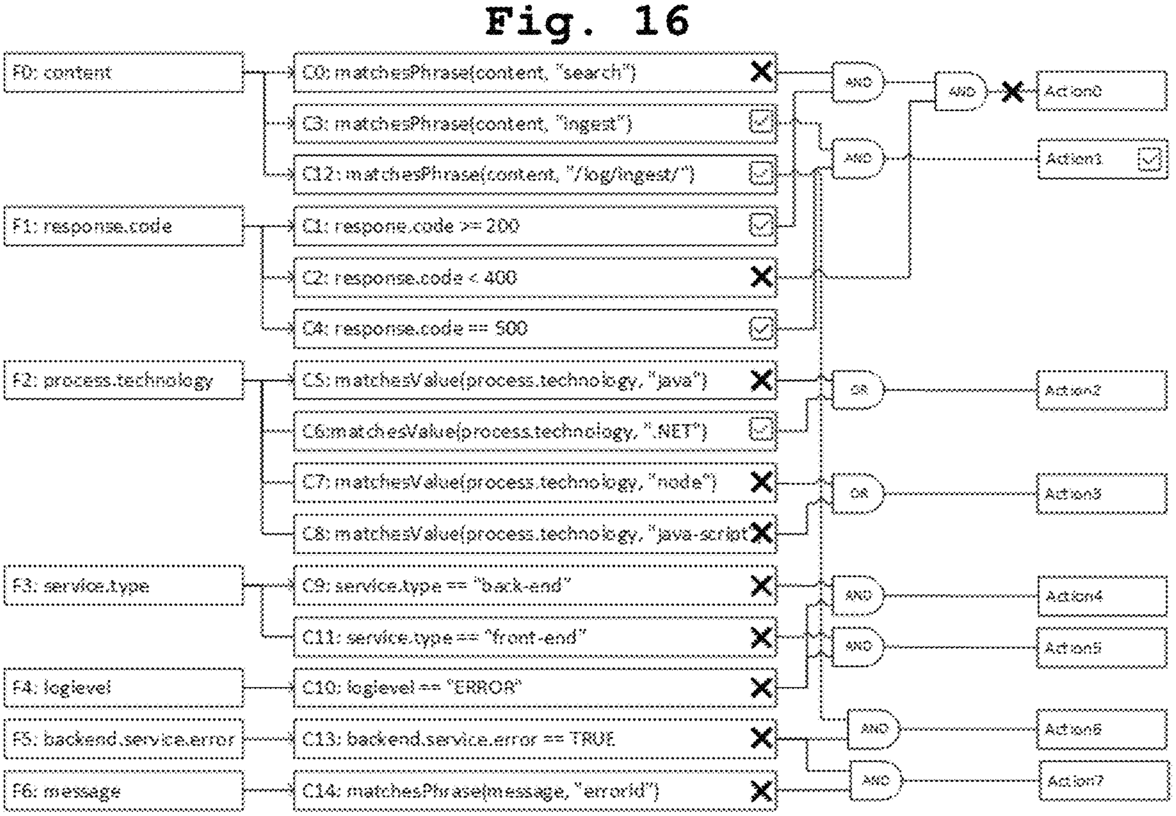
Figure 17:
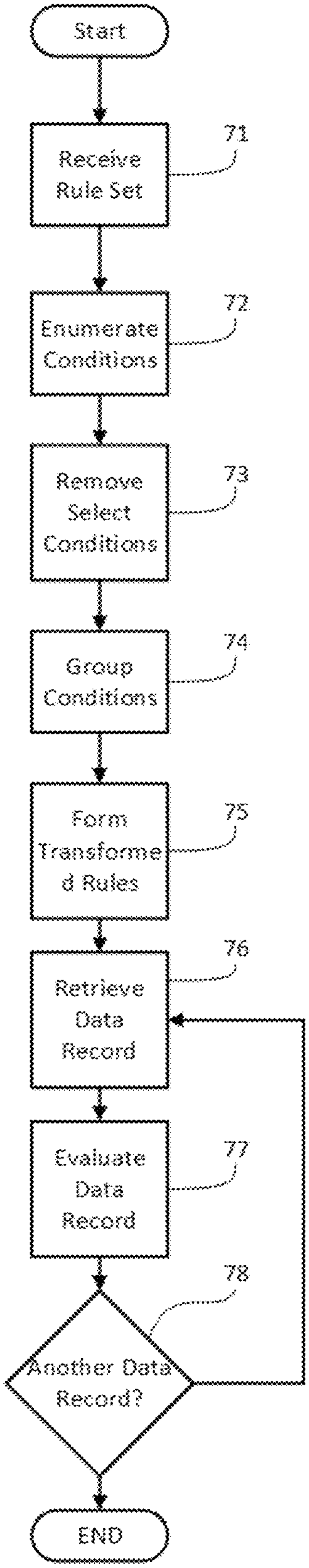

The accompanying drawings, which are incorporated in and constitute part of this specification, illustrate embodiments of the disclosure and together with the description, serve to explain the principles of the disclosure. The embodiments illustrated herein are presently preferred, it being understood, however, that the disclosure is not limited to the precise arrangements and instrumentalities shown, wherein:

FIG. 3 shows the rules and actions used in the 1st application example,

FIG. 4 shows the mapping from rules to conditions, and from conditions to data fields in the input data record in the preparation phase, FIG. 5 shows the mapping from data fields to conditions, and from conditions to rules as used in the matching phase, FIG. 6 shows the final statuses of the transformed rules in the 1st application example, FIG. 7 shows the rules and actions used in the 2nd application example, FIG. 8*a* shows intermediate statuses of the transformed rules in the 2nd application example, FIG. 8*b* shows the final statuses of the transformed rules in the 2nd application example, FIG. 9 shows the structure of the transformed rules in the 3rd application example, FIG. 10 shows the final statuses of the transformed rules in the 3rd application example, FIG. 11 shows the structure of the transformed rules in the 4th application example, FIG. 12 shows the final statuses of the transformed rules in the 4th application example, FIG. 13 shows the structure of the transformed rules in the 5th application example, FIG. 14 shows intermediate statuses of the transformed rules in the 5th application example, FIG. 15 shows the structure of the transformed rules in the 6th application example, FIG. 16 shows intermediate statuses of the transformed rules in the 6th application example, and FIG. 17 is a flowchart depicting a computer-implemented method for filtering input data records against a set of pre-defined rules.

DETAILED DESCRIPTION

Example embodiments will now be described more fully with reference to the accompanying drawings.

FIG. 17 depicts a computer-implemented method for filtering input data records against a set of pre-defined rules. As a starting point, a set of pre-defined rules are received at 71. Each rule in the set of pre-defined rules includes one or more conditions and an action taken when the one or more conditions are satisfied.

Conditions in the set of pre-defined rules are first enumerated at 72 for form an ordered list of conditions, where each condition in the ordered list of conditions is univariate, i.e., depends on a single data field. Select conditions may be removed from the ordered list of conditions as indicated at 73, where each of the removed conditions has an identical condition preceding it in the ordered list of conditions. Additionally, the conditions in the ordered list of conditions may be grouped by data field as indicated at 74.

Next, a set of transformed rules are formed at 75. For each given rule in the set of pre-defined rules, conditions in the ordered list of conditions that are associated with a given rule are connected by logical operators to form a transformed rule corresponding to the given rule in the set of pre-defined rules.

Input data records can now be filtered in relation to the set of transformed rules. To do so, a data record is retrieved at 76 and the data record is evaluated at 77 in relation to the set of transformed rules. More specifically, the data record is evaluated in relation to the set of transformed rules by evaluating each condition in the ordered list of conditions in relation to the data record; evaluating the logical operators in the set of transformed rules; and for each transformed rule in the set of transformed rules, executing the action associated with a given transformed rule when conditions for the given transformed rule are satisfied by the data record. When evaluating the logical operators in the set of transformed rules, select rules can be skipped, for example where the select rules have at least one condition that is not satisfied by the data record.

In some instances, an action executed for a particular transformed rule modifies a value of a given data field in the data record. In these instances, the data record needs to be re-evaluated in relation to the set of transformed rules. In particular, conditions in the ordered list of conditions that depend upon the value of the given data field are re-evaluated and the logical operators in the set of transformed rules are re-evaluated. Processing the set of transformed rules then continues sequentially starting from the particular transformed rule that resulted in the modification to the data record.

With continued reference to FIG. 17, additional data records can be retrieved and evaluated against the set of transformed rules as indicated at 78. The process ends when the last data record has been evaluated. Application examples illustrating this filtering method are set forth below.

In a first application example, the disclosed method for filtering a single input data record by a set of six rules, called R0 . . . R5, is demonstrated. In this example it is assumed that none of the actions Action0 . . . Action5 being taken after matching an input data record to the set of rules modifies the input data record. The rules used in this example are:

TABLE 1

Rules and matcher queries

| Rule | Matcher query |
|---|---|
| R0 | content == "c.k.m.c.processor.messageprocessor" |
| R1 | process.technology == "java" AND content == "c.k.m.c.processor.messageprocessor" |
| R2 | log.source != "/var/log/tower/tower.log" AND process.technology == "java" |
| R3 | process.technology == "kubernetes" OR process.technology == "k8s" |
| R4 | loglevel != "NONE" |
| R5 | loglevel == "NONE" AND log.source != "/var/log/tower/tower.log" |

In the matcher queries, the symbol "==" is used for an equality check between the left and the right side, and "!=" for an inequality check. The rules, short R0 for Rule #0 etc., and the respective actions are displayed in FIG. 3. The disclosed method comprises two stages, a preparation phase followed by a matching phase.

In a first step in the preparation phase, the positive unique, univariate conditions comprised in each rule are extracted from the rules. A univariate condition depends on a single field of the input data record only. This results in the following unique, univariate conditions per rule:

TABLE 2

Rules, conditions, and matcher queries

| Rule | Condition | Matcher query |
|---|---|---|
| R0 | C0 | content == "c.k.m.c.processor.messageprocessor" |
| R1 | C1 | process.technology == "java' |
| ~~R1~~ | ~~C2~~ | ~~content == "c.k.m.c.processor.messageprocessor"~~ |
| R2 | C3 | log.source == "/var/log/tower/tower.log" |
| ~~R2~~ | ~~C4~~ | ~~process.technology == "java"~~ |
| R3 | C5 | process.technology == "kubernetes" |

TABLE 2-continued

Rules, conditions, and matcher queries

| Rule | Condition | Matcher query |
| --- | --- | --- |
| R3 | C6 | process.technology == "k8s" |
| R4 | C7 | loglevel == "NONE" |
| ~~R5~~ | ~~C8~~ | ~~loglevel == "NONE"~~ |
| ~~R5~~ | ~~C9~~ | ~~log.source == "/var/log/tower/tower.log"~~ |

Note
that some of the conditions appear multiple times, e.g. C0 and C2, C1 and C4, C3 and C9, and C7 and C8. In Tab. 2 multiple instances of identical conditions are crossed out.

Discarding multiple instances of identical conditions results in the following list of ordered positive unique, univariate conditions for all rules:

TABLE 3

Rules, unique conditions, and matcher queries

| Rule | Condition | Matcher query |
| --- | --- | --- |
| R0*, R1* | C0 | content == "c.k.m.c.processor.messageprocessor" |
| R1*, R2* | C1 | process.technology == "java" |
| R2*, R5* | C2 | log.source == "/var/log/tower/tower. log" |
| R3* | C3 | process.technology == "kubernetes" |
| R3* | C4 | process.technology == "k8s" |
| R4*, R5* | C5 | loglevel == "NONE" |

The conditions C0 . . . C5 above are positive conditions only, i.e. no negations such as a NOT operator in «log level!="NONE"» are present. Alternatively, it would be possible to allow negative conditions only, or even mixed conditions. The column "Rule" in Tab. 3 indicates the transformed rule(s) evaluating the respective condition. E.g. the status of the condition C0 is used when evaluation the status of the transformed rules R0* and R1*.

By using positive conditions only instead of e.g. the expressions «log level!="NONE"» in rule R4 and «log level=="NONE"» forming part of rule R5, only a single condition C5 needs to be evaluated. Its negation is realized by the Boolean NOT operator. This results in fewer conditions and is computationally much more efficient.

Next, the conditions are grouped according to the data field in the input data record, i.e. the data field the condition depends on. This results in the following table of conditions and fields:

TABLE 4

Fields and conditions

| Condition | Field ID | Field in input data record |
| --- | --- | --- |
| C0 | F0 | content |
| C1 | F1 | process.technology |
| C3 | F1 | process.technology |
| C4 | F1 | process.technology |
| C2 | F2 | log.source |
| C5 | F3 | loglevel |

To conclude the preparation phase, the rules are logically identical to the transformed rules featuring logical operators, comprising Boolean operators and the Identity operator, operating on the conditions:

R0*:=C0

R1*:=C1 AND C0

R2*:=NOT (C2) AND C1

R3*:=C3 OR C4

R4*:=NOT (C5)

R5*:=C5 AND NOT (C2)

The mapping from the ordered list of rules to an ordered list of conditions, and from the ordered list of conditions to an ordered list of fields is shown in FIG. 4. The steps in the preparation phase will be repeated as soon as at least one rule changes.

In the matching phase after the preparation phase, the following input data record is assumed to be present:

TABLE 5

Input data record

| Field ID | Field in data record | Value |
| --- | --- | --- |
| F0 | "content" | "c.k.m.c.processor.messageprocessor" |
| F1 | "process.technology" | "java" |
| F2 | "log.source" | "/var/log/elasticsearch" |
| F3 | "loglevel" | "INFO" |

The direction of mappings in the matching phase is from fields to conditions, and by applying logical operators to conditions to transformed rules. (see FIG. 5) and therefore in opposite direction as in the preparation phase.

As a first step in the matching phase, the conditions are evaluated against the input data record. Preferably, the order of evaluation follows the fields. This yields the following statuses of the conditions:

TABLE 6

Statuses of conditions

| Field ID | Condition | Matcher query | Status |
| --- | --- | --- | --- |
| F0 | C0 | content == "c.k.m.c.processor.messageprocessor" | TRUE |
| F1 | C1 | process.technology == "java" | TRUE |
| F1 | C3 | process.technology == "kubernetes" | FALSE |
| F1 | C4 | process.technology == "k8s" | FALSE |
| F2 | C2 | log.source == "/var/log/tower/tower.log" | FALSE |
| F3 | C5 | loglevel == "NONE" | FALSE |

Consequently, the conditions C0 and C1 are TRUE, and C2 . . . C5 are FALSE.

Next, the transformed rules comprising the conditions C0 . . . C5 and logical operators are evaluated sequentially in ascending order. This yields the following results:

TABLE 7

| Statuses of rules | | |
|---|---|---|
| Transformed rule | Status | Result |
| R0* := C0 | TRUE | Action0 |
| R1* := C1 AND C0 | TRUE | Action1 |
| R2* := NOT(C2) AND C1 | TRUE | Action2 |
| R3* := C3 OR C4 | FALSE | — |
| R4* := NOT(C5) | TRUE | Action4 |
| R5* := C5 AND NOT(C2) | FALSE | — |

In case the status of a transformed rule is TRUE, the respective action will be executed. In this example Action0, Action1, Action2, and Action4 are executed, whereas Action3 and Action 5 are not executed. FIG. 6 shows.

In contrast to prior-art solutions, the disclosed method is suitable for high and extremely high data input rates since thousands of rules can be processed in real-time. Due to the splitting of rules into an ordered list of unique, univariate conditions and the fact that the conditions are present in multiple rules, the evaluation of rules is a lot quicker than in the prior art since conditions are evaluated just once.

In a second application example, the rules R0 . . . R5 from the 1st application example are reused. Apart from using a different input data record, it is assumed that the action "Action3" following R3 changes the field "log level" in the input data record to "INFO". The other actions following rules R0 . . . R2, R4 and R5 do not modify data (see FIG. 7).

As the rules are the same as in the 1st application example, the preparation phase is identical to the 1st application example. Therefore, the transformed rules from the 1st application example are reused.

In the matching phase, the following data record is assumed:

TABLE 8

| Input data record | |
|---|---|
| Field in data record | Value |
| F0: "content" | "INFO pod has been started" |
| F1: "process.technology" | "k8s" |
| F2: "log.source" | " " |
| F3: "loglevel" | "NONE" |

First in the matching phase, the conditions are evaluated against the input data record. This yields the following statuses of the conditions:

TABLE 9

| Statuses of conditions | | | |
|---|---|---|---|
| Field ID | Condition | Matcher query | Status |
| F0 | C0 | content == "c.k.m.c.processor.messageprocessor" | FALSE |
| F1 | C1 | process.technology == "java' | FALSE |
| F1 | C3 | process.technology == "kubernetes" | FALSE |
| F1 | C4 | process.technology == "k8s" | TRUE |
| F2 | C2 | log.source == "/var/log/tower/tower.log" | FALSE |
| F3 | C5 | loglevel == "NONE" | TRUE |

In other words, the conditions C4 and C5 are TRUE, and C0 . . . C3 are FALSE.

Next, the transformed rules are evaluated sequentially in ascending order based on the statuses of the conditions C0 . . . C5, i.e. starting with R0*, then R1*, R2* etc.

TABLE 10

| Statuses of rules | | |
|---|---|---|
| Transformed rule | Status | Result |
| R0* := C0 | FALSE | — |
| R1* := C1 AND C0 | FALSE | — |
| R2* := NOT(C2) AND C1 | FALSE | — |
| R3* := C3 OR C4 | TRUE | Action3 |

It turns out that the status of R0*, R1* and R2* is FALSE and the status or R3* is TRUE. The intermediate states of conditions C0 . . . C5 and transformed rules R0* . . . R3* before executing Action 3 are shown in FIG. 8*a*. Note that R4* and R5* have not yet been evaluated. As the condition in the transformed rule R3* is fulfilled, Action3 is executed changing the data record "log level" to "INFO". After executing Action3, the input data record is as follows:

TABLE 11

| Modified input data record | |
|---|---|
| Data record | Value |
| F0: "content" | "INFO pod has been started" |
| F1: "process.technology" | "k8s" |
| F2: "log.source" | " " |
| F3: "loglevel" | "INFO" |

As only one field F3 in the input data record changed, only one condition, namely C5, being dependent from the data record "log level" needs to be re-evaluated. This yields the following result:

TABLE 12

| Re-evaluation of C5 | | | |
|---|---|---|---|
| Field | Condition | Matcher query | Status |
| loglevel | C5 | loglevel == "NONE" | FALSE |

Note
that all other conditions remain unchanged.
Thus the conditions have the following statuses: C0 . . . C3 and C5 are FALSE, and C4 is TRUE.

Following this modification of the input data record and the re-evaluation of the affected condition, the processing of rules is continued. After R3*, the transformed rule R4* is evaluated. This yields the following result:

TABLE 13

| Statuses of rules, continued | | |
|---|---|---|
| Transformed rule | Status | Result |
| R4* := NOT(C5) | TRUE | Action4 |

As Action4 does not change the input data record, the processing of rules is continued with R5*. This yields:

TABLE 14

| Statuses of rules, continued | | |
|---|---|---|
| Transformed rule | Status | Result |
| R5* := C5 AND NOT(C2) | FALSE | — |

In total, both Action3 and Action4 are executed. The final status is displayed in FIG. 8*b*.

In a third application example four filtering rules are present and the actions following the rules do not modify the data record. The following rules and actions are assumed to be present:

TABLE 15

| Rules, matcher queries, and actions |
|---|
| Rule R0 |
| Matcher query:<br>content == "event" AND loglevel == "INFO"<br>Action A0:<br>no data modification |
| Rule R1 |
| Matcher query:<br>content == "log*" AND (loglevel == "WARN" OR loglevel == "INFO")<br>Action A1:<br>no data modification |
| Rule R2 |
| Matcher query:<br>dt.scurity_context == "us-west-1" OR dt.scurity_context == "us-west-2"<br>Action A2:<br>no data modification |
| Rule R3 |
| Matcher query:<br>dt.ingest.warnings == "input*" AND loglevel == "WARN"<br>Action A3:<br>no data modification |

Note
that the matcher queries of rules R1 and R3 comprise the well-known "*" wildcard operator.

As in the previous examples, the rules are split into an ordered list of unique, univariate conditions. This yields the following conditions:

TABLE 16

Rules, conditions, and matcher queries

| Condition | Matcher query | Rule |
|---|---|---|
| C0 | content == "event" | R0 |
| C1 | loglevel == "INFO" | R0, R1 |
| C2 | content == "log*" | R1 |
| C3 | loglevel == "WARN" | R1, R3 |
| C4 | dt.scurity_context == "us-west-1" | R2 |
| C5 | dt.scurity_context == "us-west-2" | R2 |
| C6 | dt.ingest.warnings == "input*" | R3 |

Following this, the conditions can be grouped according to the data fields in the input data record:

TABLE 17

Fields and conditions

| Field in data record | Field ID | Condition |
|---|---|---|
| content | F0 | C0, C2 |
| loglevel | F1 | C1, C3 |
| dt.scurity_context | F2 | C4, C5 |
| dt.ingest.warnings | F3 | C6 |

To conclude the preparation phase, the rules can be rewritten as transformed rules featuring conditions and logical operators operating on these conditions as follows:

R0*:=C0 AND C1

R1*:=C2 AND (C3 OR C1)

R2*:=C4 OR C5

R3*:=C6 AND C3

The structure of data fields, transformed rules comprising conditions and logical operators, and actions is shown in FIG. 9.

In the matching phase of the disclosed method, the following input data record is assumed:

```
Input record: {
  "loglevel": "WARN",
  "process. technology": "java",
  "content": "logger: com.java.lang - Warning: Missing
argument",
  "dt.scurity_context": "us-west-1",
  "dt.ingest.warnings": "input value limited"
}
```

The evaluation of conditions yields the following states of the conditions:

TABLE 18

Statuses of conditions

| Field in input data record | Condition | Status | Pre-selected rules Id |
|---|---|---|---|
| content | C0 | FALSE | |
| | C2 | TRUE | R1* |
| loglevel | C1 | FALSE | |
| response.code | C3 | TRUE | R1*, R3* |
| dt.scurity_context | C4 | TRUE | R2* |
| | C5 | FALSE | |
| dt.ingest.warnings | C6 | TRUE | R3* |

The column "Pre-selected rules Id" maps a TRUE status of a condition, e.g. C2, to a respective transformed rule, here R1*, as C2 is used when evaluating R1*. As the transformed rule R0* is not present in the column "Pre-selected rules Id" above, R0* does not need to be evaluated at all. This reduces complexity!

Based on the status of conditions, only the transformed rules R1*, R2* and R3* are evaluated. The evaluation yields the following results:

TABLE 19

Statuses of rules

| Pre-selected rule Id | Logical representation | Status | Result |
|---|---|---|---|
| R1* | C2 AND (C3 OR C1) | TRUE | Action1 |
| R2* | C4 OR C5 | TRUE | Action2 |
| R3* | C6 AND C3 | TRUE | Action3 |

Finally, the actions following the rules R1*, R2* and R3* having a "TRUE" status are executed. The statuses of conditions, transformed rules, and actions are shown in FIG. 10.

A fourth application example shows another case where actions modify multiple data records. The following rules and actions are assumed:

TABLE 20

| Rules, matcher queries, and actions |
|---|
| Rule R0 |
| Matcher query:<br>content == "http*" AND respone.code >= 200 AND response.code < 400<br>Action A0:<br>put loglevel = "INFO" |
| Rule R1 |
| Matcher query:<br>content == "http*" AND response.code == 500<br>Action A1:<br>put loglevel = "ERROR" |
| Rule R2 |
| Matcher query:<br>process.technology == "java" OR process.technology == "nginx" OR process.technology == "azure"<br>Action A2:<br>put service.type = "API" |
| Rule R3 |
| Matcher query:<br>service.type == "API" AND loglevel == "ERROR"<br>Action A3:<br>put api.error = TRUE |

First, the rules R0 . . . R3 are split into conditions, which yields the following list of ordered, unique, univariate conditions:

TABLE 21

Rules, matcher queries, and conditions

| Condition | Matcher query | Rule |
|---|---|---|
| C0 | content == "http*" | R0, R1 |
| C1 | respone.code >= 200 | R0 |
| C2 | respone.code < 400 | R0 |
| C3 | respone.code == 500 | R1 |
| C4 | process.technology == "java" | R2 |
| C5 | process.technology == "nginx" | R2 |
| C6 | process.technology == "azure" | R2 |
| C7 | service.type == "API" | R3 |
| C8 | loglevel == "ERROR" | R3 |

Next, the conditions are grouped according to the visited field:

TABLE 22

Fields and conditions

| Field in data record | Field ID | Conditions |
|---|---|---|
| content | F0 | C0 |
| response.code | F1 | C1, C2, C3 |
| process.technology | F2 | C4, C5, C6 |
| service.type | F3 | C7 |
| loglevel | F4 | C8 |

Next, the transformed rules are represented by logical operators operating on the conditions:

R0*:=C0 AND C1 AND C2

R1*:=C0 AND C3

R2*:=C4 OR C5 OR C6

R3*:=C7 AND C8

In the preparation phase, the structure of data fields, transformed rules comprising conditions and logical operators, and actions was derived as shown in FIG. 11.

In the matching phase of the method, the following inputs are used:

```
Input record: {
  "content": "http response: Service Unavailable:
log.ingest.api"
  "response.code": 500,
  "process.technology": "java",
  "loglevel": "NONE",
  "log.source": "/var/log/rest/response.log"
}
```

Based on these input data records, the conditions are evaluated:

TABLE 23

Statuses of conditions

| Field in data record | Condition | Status | Pre-selected rules Id |
|---|---|---|---|
| content | C0 | TRUE | R0*, R1* |
| response.code | C1 | TRUE | R0* |
| | C2 | FALSE | |
| | C3 | TRUE | R1* |
| process.technology | C4 | TRUE | R2* |
| | C5 | FALSE | |
| | C6 | FALSE | |
| service.type | C7 | FALSE | |
| loglevel | C8 | FALSE | |

It turns out that only conditions C0, C1, C3 and C4 are fulfilled.

Next, the pre-selected rules associated with TRUE conditions are executed one by one, starting with the lowest ranking rule, here R0.

TABLE 24

Statuses of rules

| Pre-selected rule Id | Logical representation | Status | Action |
|---|---|---|---|
| R0* | C0 AND C1 AND C2 | FALSE | — |
| R1* | C0 AND C3 | TRUE | put loglevel = "ERROR" |

Note that as R0* has the status FALSE, no action is taken and R1* is processed. As R1* has a TRUE status, the action A1 associated with R1* is executed. Thus the input data record is modified as follows:

```
Input record: {
  "content": "http response: Service Unavailable:
log.ingest.api",
  "response.code": 500,
  "process.technology": "java",
  "loglevel": "ERROR",
  "log.source": "/var/log/rest/response.log"
}
```

As only the field "log level" is changed, it is sufficient to re-evaluate the dependent conditions, namely C8. The evaluation of C8 yields:

TABLE 25

| Revisited condition | | | |
|---|---|---|---|
| Field | Condition | Matching | Pre-selected rules Id |
| loglevel | C8 | TRUE | R3* |

Continuing the evaluation of rules with R2* yields:

TABLE 26

| Statuses of rules, continued | | | |
|---|---|---|---|
| Pre-selected rule Id | Logical representation | Status | Action |
| R2* | C4 OR C5 OR C6 | TRUE | put service.type = "API" |

Executing the action associated with R2* yields the following data record:

Input record: {
"content": "http response: Service Unavailable: log. ingest.api",
"response.code": 500,
"process.technology": "java",
"service.type": "API",
"loglevel": "ERROR",
"log.source": "/var/log/rest/response.log"
}

As only the data record "service.type" was changed, the conditions associated with this field are re-evaluated. This yields:

TABLE 27

| Revisited condition | | | |
|---|---|---|---|
| Field | Condition | Matching | Pre-selected rules Id |
| service.type | C7 | TRUE | R3* |

The evaluation of rules is continued with R3, which yields:

TABLE 28

| Statuses of rules, continued | | | |
|---|---|---|---|
| Pre-selected rule | Logical representation | Status | Action |
| R3* | C7 AND C8 | TRUE | put api.error = "TRUE" |

Executing A3 yields the following data record:

Input record: {
"content": "http response: Service Unavailable: log.ingest.api",
"response.code": 500,
"process.technology": "java",
"loglevel": "ERROR",
"service.type": "API",
"log.source": "/var/log/rest/response.log",
"api.error": "TRUE"
}

As no condition depends on the data record "api.error", no condition needs to be evaluated. In addition, as the last pre-selected rule was already executed, the matching phase of the method is finished. The final status of conditions, transformed rules, and actions is shown in FIG. 12.

A fifth application example shows another case similar to the third application example where actions do not modify the input data records. The following rules and actions are assumed:

TABLE 29

| Rules, matcher queries, and actions |
|---|
| Rule R0 |
| Matcher query:<br>matches Value(dt.metric_key, "pubsub.*") AND<br>(region == "us-west-1" OR region == "europe-central2")<br>Action A0:<br>no modification of input data record |
| Rule R1 |
| Matcher query:<br>container_name !="" AND network == "ipv4"<br>Action A1:<br>no modification of input data record |
| Rule R2 |
| Matcher query:<br>matchesValue(dt.metric_key, "networking.*") OR isNull(region)<br>Action A2:<br>no modification of input data record |

TABLE 29-continued

| Rules, matcher queries, and actions |
| --- |
| Rule R3 |
| Matcher query:<br>dt.metric_key == "function.execution_times" AND status == "error"<br>Action A3:<br>no modification of input data record |
| Rule R4 |
| Matcher query:<br>dt.metric_key == "function.execution_times" AND status == "out of memory" AND memory > 1024<br>Action A4:<br>no modification of input data record |
| Rule R5 |
| Matcher query:<br>matches Value(instance_name, "CI-*") AND<br>(storage_type == "pd-standard" OR storage_type == "pd-premium")<br>Action A5:<br>no modification of input data record |
| Rule R6 |
| Matcher query:<br>is_healthy == FALSE AND matchesValue(instance_name, "PROD")<br>Action A6:<br>no modification of input data record |
| Rule R7 |
| Matcher query:<br>matchesValue(instance_name, "PROD") AND storage_type == "pd-premium"<br>Action A7:<br>no modification of input data record |

In this case, some matcher queries feature wildcards and a function "matchesValue", which checks whether a term, e.g. "PROD", is present in a specific data field, e.g. "instance_name".

In a first step, the rules are split into an ordered list of unique, univariate conditions:

TABLE 30

Rules, conditions, and matcher queries

| Condition | Matcher query | Rule |
| --- | --- | --- |
| C0 | matchesValue(dt.metric_key, "pubsub.*") | R0 |
| C1 | region == "us-west-1" | R0 |
| C2 | region == "europe-central2" | R0 |
| C3 | container_name != "" | R1 |
| C4 | network == "ipv4" | R1 |
| C5 | matchesValue(dt.metric_key, "networking.*") | R2 |
| C6 | isNull(region) | R2 |
| C7 | dt.metric_key == "function. execution_times" | R3, R4 |
| C8 | status == "error" | R3 |
| C9 | status == "out of memory" | R4 |
| C10 | memory > 1024 | R4 |
| C11 | matchesValue(instance_name, "CI-*") | R5 |
| C12 | storage_type == "pd-standard" | R5 |
| C13 | storage_type == "pd-premium" | R5, R7 |
| C14 | is_healthy==false | R6 |
| C15 | matchesValue(instance_name, "PROD") | R6, R7 |

The 15 conditions are then grouped according to the visited data fields, which yields:

TABLE 31

Data fields and conditions

| Field in data record | Field ID | Conditions |
| --- | --- | --- |
| dt.metric_key | F0 | C0, C5, C7 |
| region | F1 | C1, C2, C6 |
| container_name | F2 | C3 |
| network | F3 | C4 |
| status | F4 | C8, C9 |
| memory | F5 | C10 |
| instance_name | F6 | C11, C15 |
| storage_type | F7 | C12, C13 |
| is_healthy | F8 | C14 |

As the last step in the preparation phase, the rules are represented as transformed rules featuring logical operators operating on the conditions. This yields:

R0*:=C0 AND (C1 OR C2)
R1*:=C3 AND C4
R2*:=C5 OR C6
R3*:=C7 AND C8
R4*:=C7 AND C9 AND C10
R5*:=C11 AND (C12 OR C13)
R6*:=C14 AND C15
R7*:=C15 AND C13

The structure of data fields, transformed rules comprising conditions and logical operators, and actions as derived in the preparation phase is displayed in FIG. 13.

In the matching phase, the following input data records are assumed to be present:

Input record: {
"loglevel": "NONE",
"process.technology": "java",

-continued

"content": "http response: Service Unavailable: log.ingest.api",
"is_healthy ": FALSE,
"dt.metric_key": "function.execution_times",
"storage_type": "pd-premium",
"status": "out of memory",
"memory": 2048,
"region": "europe-central2",
"container name": "cluster",
"network": "ipv4",
"instance_name": "PROD"
}

As a first step in the matching phase, the conditions C1-C15 are evaluated against the input data record. This yields the following states:

TABLE 32

Statuses of conditions

| Field | Condition | Status | Pre-selected rules Id |
|---|---|---|---|
| dt.metric_key | C0 | FALSE | |
| | C5 | FALSE | |
| | C7 | TRUE | R3*, R4* |
| region | C1 | FALSE | |
| response.code | C2 | TRUE | R0* |
| | C6 | FALSE | |
| container_name | C3 | TRUE | R1* |
| network | C4 | TRUE | R1* |
| status | C8 | FALSE | |
| | C9 | TRUE | R4* |
| memory | C10 | TRUE | R4* |
| instance_name | C11 | FALSE | |
| | C15 | TRUE | R6*, R7* |
| storage_type | C12 | FALSE | |
| | C13 | TRUE | R5*, R7* |
| is_healthy | C14 | TRUE | R6* |

Note
that in the column "Pre-selected rules Id" of the above table, the transformed rule/rules where a specific condition is applied is given for matching conditions only, i.e. conditions being TRUE. This is relevant because in the current state of the conditions, rules not present in the column "Pre-selected rules Id" will not be executed in any case. In other words, it is not even necessary to evaluate the Boolean operators for rule R2*, in this case.

In a preferred embodiment of the disclosure, the statuses of the conditions—in our case C0 . . . C14—are mapped to a Bit Array having a least the length of the unique conditions. As there are 15 conditions, the statuses can be mapped to a 15-bit array or to a 16-bit array (2 Bytes). Mapping a TRUE status to 1 and a FALSE status to 0, a 15-bit array has a binary value of "001 110 010 110 011 1". The status of the conditions is shown in FIG. 14.

Next, the transformed rules being present in the above table are evaluated based on the Boolean operators operating on the conditions C0 . . . C14. This yields the following results:

TABLE 33

Statuses of rules

| Pre-selected rule Id | Logical representation | Status | Result |
|---|---|---|---|
| R0* | C0 AND (C1 OR C2) | FALSE | — |
| R1* | C3 AND C4 | TRUE | Action1 |
| R3* | C7 AND C8 | FALSE | — |
| R4* | C7 AND C9 AND C10 | TRUE | Action4 |
| R5* | C11 AND (C12 OR C13) | FALSE | — |
| R6* | C14 AND C15 | TRUE | Action6 |
| R7* | C15 AND C13 | TRUE | Action7 |

Consequently, only the actions A1, A4, A6 and A7 are executed (see FIG. 14).

A sixth application example shows another case where actions modify multiple data records. The following rules and actions are assumed:

TABLE 34

| Rules, matcher queries, and actions |
|---|
| Rule 0 |
| Matcher:<br>matchesPhrase(content, "search") AND respone.code >= 200 AND response.code < 400<br>Action A0:<br>put loglevel = "INFO" |
| Rule 1 |
| Matcher:<br>matchesPhrase(content, "ingest") AND response.code == 500<br>Action A1:<br>put loglevel = "ERROR" |
| Rule 2 |
| Matcher:<br>matchesValue(process.technology, "java") OR matchesValue(process.technology, ".NET")<br>Action A2:<br>put service.type = "back-end" |
| Rule 3 |
| Matcher:<br>matchesValue(process.technology, "node") OR matchesValue(process.technology, "java-script")<br>Action A3:<br>put service.type = "front-end" |
| Rule 4 |
| Matcher:<br>service.type == "back-end" AND loglevel == "ERROR"<br>Action A4:<br>put backend.service.error = TRUE |
| Rule 5 |
| Matcher:<br>service.type == "front-end" AND loglevel == "ERROR"<br>Action A5:<br>put frontend.service.error = TRUE |
| Rule 6 |
| Matcher:<br>matchesPhrase(content, "/log/ingest/") AND backend.service.error == TRUE<br>Action A6:<br>put message = content |
| Rule 7 |
| Matcher:<br>matchesPhrase(message, "errorId") AND backend. service.error == TRUE<br>Action A7:<br>put error.id = 12 |

In a first step, the matcher queries for rules R0 . . . R7 are split into an ordered list of unique, univariate conditions. This yields the following conditions C0 . . . C14:

TABLE 35

Rules, conditions, and matcher queries

| Condition | Matcher query | Rules |
|---|---|---|
| C0 | matchesPhrase(content, "search") | R0 |
| C1 | respone.code >=200 | R0 |
| C2 | respone.code < 400 | R0 |
| C3 | matchesPhrase(content, "ingest") | R1 |
| C4 | respone.code == 500 | R1 |

TABLE 35-continued

Rules, conditions, and matcher queries

| Condition | Matcher query | Rules |
|---|---|---|
| C5 | matchesValue(process.technology, "java") | R2 |
| C6 | matchesValue(process.technology, "NET") | R2 |
| C7 | matchesValue(process.technology, "node") | R3 |
| C8 | matchesValue(process.technology, "java-script") | R3 |
| C9 | service.type == "back-end" | R4 |
| C10 | loglevel == "ERROR" | R4, R5 |
| C11 | service.type == "front-end" | R5 |
| C12 | matchesPhrase(content, "/log/ingest/") | R6 |
| C13 | backend.service.error == TRUE | R6, R7 |
| C14 | matchesPhrase(message, "errorId") | R7 |

The column "Rules" notes the rule(s) where a specific condition is applied.

Next, the conditions are grouped in order of the visited field. This yields:

TABLE 36

Fields and conditions

| Field in data record | Field ID | Conditions |
|---|---|---|
| content | F0 | C0, C3, C12 |
| response.code | F1 | C1, C2, C4 |
| process.technology | F2 | C5, C6, C7, C8 |
| service.type | F3 | C9, C11 |
| loglevel | F4 | C10 |
| backend.service.error | F5 | C13 |
| message | F6 | C14 |

As the last step in the preparation phase, the transformed rules are represented as conditions and logical operators, yielding:

R0*:=C0 AND C1 AND C2

R1*:=C3 AND C4

R2*:=C5 OR C6

R3*:=C7 OR C8

R4*:=C9 AND C10

R5*:=C11 AND C10

R6*:=C12 AND C13

R7*:=C14 AND C13

The structure of data fields, transformed rules comprising conditions and logical operators, and actions is displayed in FIG. 15.

In the matching phase of the disclosed method, the following input data records are assumed to be present:

```
Input record: {
  "loglevel": "NONE",
  "process.technology": [".NET", "azure"],
  "content": "Error on ingest endpoint: /rest/api/log/ingest
message: Log too long. errorId: 12",
  "log.source": "/var/log/rest/response.log",
  "response.code": 500
}
```

Note that the field "process.technology" in the input data record comprises two values, namely ".NET" and "azure".

As a first step in the matching phase following the preparation phase, the conditions are evaluated against the input data records, yielding:

TABLE 37

Statuses of conditions

| Field | Condition | Status | Pre-selected rules Id |
|---|---|---|---|
| content | C0 | FALSE | |
| | C3 | TRUE | R1* |
| | C12 | TRUE | R6* |
| response.code | C1 | TRUE | R0* |
| | C2 | FALSE | |
| | C4 | TRUE | R1* |
| process.technology | C5 | FALSE | |
| | C6 | TRUE | R2* |
| | C7 | FALSE | |
| | C8 | FALSE | |
| service.type | C9 | FALSE | |
| | C11 | FALSE | |
| loglevel | C10 | FALSE | |
| backend.service.error | C13 | FALSE | |
| message | C14 | FALSE | |

As above, the statues of the conditions can be represented by a binary value, here "010110100000100", in a 15-bit array. Next in the matching phase, the rules will be evaluated sequentially in ascending order starting from the lowest transformed rule R0* in the column of "Pre-selected rules ID" above. This yields:

TABLE 38

Statuses of rules

| Pre-selected rule Id | Logical representation | Status | Action |
|---|---|---|---|
| R0* | C0 AND C1 AND C2 | FALSE | |
| R1* | C3 AND C4 | TRUE | put loglevel = "ERROR" |

The status of the conditions and transformed rules R0* and R1* are shown in FIG. 16.

Note that the logical representation of R0* yields FALSE, consequently, the next higher-ranking rule is evaluated, which is R1*. As the evaluation of R1* yields TRUE, the action A1 associated with R1* is executed. This changes the input data record as follows:

```
Input record: {
  "loglevel": "ERROR",
  "process.technology": [".NET", "azure"] ,
  "content": "Error on ingest endpoint: /rest/api/log/ingest
message: Log too long. errorId: 12",
  "log.source": "/var/log/rest/response.log",
  "response.code": 500
}
```

The changed data record is printed bold above.

As only one data record was changed, the conditions depending on a single field need to be re-evaluated. This yields:

TABLE 9

Re-evaluated condition

| Field | Condition Id | Status | Pre-selected rules Id |
|---|---|---|---|
| loglevel | C10 | TRUE | R4*, R5* |

Following this, the evaluation of rules is continued with R2*.

TABLE 40

| Statuses of rules, continued | | | |
|---|---|---|---|
| Pre-selected rule Id | Logical representation | Status | Action |
| R2* | C5 OR C6 | TRUE | put service. type = "back-end" |

As the matching query for R2* is TRUE, the action A2 associated with it is executed. This changes the input data record as follows:

```
Input record: {
  "loglevel": "ERROR",
  "process.technology": [".NET", "azure"] ,
  "content": "Error on ingest endpoint: /rest/api/log/ingest
message: Log too long. errorId: 12",
  "log.source": "/var/log/rest/response.log",
  "response.code": 500,
  "service.type": "back-end"
}
```

As two conditions depend on the field service.type, these two conditions, namely C9 and C11, need to be re-evaluated. These yield:

TABLE 41

| Re-evaluated condition, continued | | | |
|---|---|---|---|
| Field | Condition Id | Status | Pre-selected rules |
| service.type | C9 | TRUE | R4* |
| | C11 | FALSE | |

The execution of rules is continued, however, as the rule R3* is no re-selected rules ID for any condition, R3* is omitted and rule R4* is next.

The evaluation of R4* yields:

TABLE 42

| Statuses of rules, continued | | | |
|---|---|---|---|
| Pre-selected rule ID | Logical representation | Status | Action |
| R4* | C7 AND C8 | TRUE | put backend.service. error = TRUE |

As the matching query for R4* is TRUE, the action A4 associated to R4* is executed. This changes the input data record as follows:

```
Input record: {
  "loglevel": "ERROR",
  "process.technology": [".NET", "azure"],
  "content": "Error on ingest endpoint: /rest/api/log/ingest
message: Log too long. errorId: 12",
  "log.source": "/var/log/rest/response.log",
  "response.code": 500,
  "service.type": "backend",
  "backend.service.error": TRUE
}
```

As only condition C13 depends on the field backend.service.error, only C13 needs to be re-evaluated, yielding:

TABLE 43

| Re-evaluated condition, continued | | | |
|---|---|---|---|
| Field | Condition Id | Status | Pre-selected rules Id |
| backend.service.error | C13 | TRUE | R6*, R7* |

After this, the evaluation of rules is continued with rule R5*. As the condition of R5* is not fulfilled, the evaluation continues with R6*.

TABLE 44

| Statuses of rules, continued | | | |
|---|---|---|---|
| Pre-selected rule Id | Logical representation | Status | Action |
| R5* | C11 AND C10 | FALSE | |
| R6* | C12 AND C13 | TRUE | put message = content |

Executing action A6 associated with R6* yields the following input data records:

```
Input record: {
  "loglevel": "ERROR",
  "process.technology": [".NET", "azure"],
  "content": "Error on ingest endpoint: /rest/api/log/ingest
message: Log too long. errorId: 12",
  "log.source": "/var/log/rest/response.log",
  "response.code": 500,
  "service.type": "back-end",
  "backend.service.error": true,
  "message": "Error on ingest endpoint: /rest/api/log/ingest
message: Log too long. errorId: 12"
```

As only condition C14 depends on the field message, only this condition needs to be re-evaluated, yielding:

TABLE 45

| Re-evaluated condition, continued | | | |
|---|---|---|---|
| Field | Condition Id | Status | Pre-selected rules Id |
| message | C14 | TRUE | R7* |

Next, the evaluation of rules is continued with rule R7*. As the condition of R7* is fulfilled (see table below), the action A7 is executed:

TABLE 46

| Statuses of rules, continued | | | |
|---|---|---|---|
| Pre-selected rule Id | Logical representation | Status | Action |
| R7* | C14 AND C13 | TRUE | put error.id = 12 |

The action A7 changes the input data records as follows:

```
Input record: {
  "loglevel": "ERROR",
  "process.technology": [".NET", "azure"],
```

-continued

"content": "Error on ingest endpoint: /rest/api/log/ingest message: Log too long. errorId: 12",
"log.source": "/var/log/rest/response.log",
"response.code": 500,
"service.type": "back-end",
"backend.service.error": true,
"message": " Log too long. errorId: 12",
"error.id": 12
}

As no condition depends on the field error.id, consequently no condition needs to be re-evaluated. As R7* is the last transformed rule in the list of predefined rules, the disclosed method is stopped.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMS, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for filtering a data record against a set of pre-defined rules, comprising:

receiving, by a computer processor, a set of pre-defined rules where the number of rules is on the order of thousands or more, each rule in the set of pre-defined rules includes one or more conditions and an action taken when the one or more conditions are satisfied;

enumerating, by the computer processor, conditions in the set of pre-defined rules for form an ordered list of conditions, where each entry in the ordered list of conditions represents one condition from the set of pre-defined rules and each condition in the ordered list of conditions depends on only one field in a given data record;

filtering conditions from the ordered list of conditions by removing conditions preceded in the ordered list of conditions by an identical condition having identical fields and values and removing conditions preceded in the ordered list of conditions by a logically complementary condition having identical fields and values;

for each given rule in the set of pre-defined rules, connecting, by the computer processor, conditions in the ordered list of conditions that are associated with a given rule by logical operators to form a transformed rule corresponding to the given rule in the set of pre-defined rules, thereby forming a set of transformed rules;

receiving, by the computer processor, a data record having one or more data fields; and evaluating, by the computer processor, the data record in relation to the set of transformed rules.

2. The method of claim 1 further comprises receiving another data record, and evaluating the another data record in relation to the set of transformed rules.

3. The method of claim 1 wherein evaluating the data record further comprises processing the set of transformed rules sequentially in ascending order.

4. The method of claim 3 wherein the data record is evaluated in relation to the set of transformed rules by evaluating each condition in the ordered list of conditions in relation to the data record;

evaluating the logical operators in the set of transformed rules; and for each transformed rule in the set of transformed rules, executing the action associated with a given transformed rule when the data record matches the given transformed rule.

5. The method of claim 4 wherein evaluating the logical operators in the set of transformed rules includes skipping select rules, where the select rules have at least one condition that is not satisfied by the data record.

6. The method of claim 4 further comprises executing an action for a particular transformed rule that modifies value of a given data field in the data record;

re-evaluating conditions in the ordered list of conditions that depend upon the value of the given data field;

re-evaluating the logical operators in the set of transformed rules; and continue processing the set of transformed rules sequentially starting from the particular transformed rule.

7. The method of claim 6 further comprises continue processing the set of transformed rules sequentially starting from a first transformed rule in the set of transformed rules when at least one logical operator is a negation operator.

8. The method of claim 1 further comprises grouping conditions in the ordered list of conditions by data field prior to the step of evaluating the data record in relation to the set of transformed rules.

9. A non-transitory computer-readable medium having computer-executable instructions that, upon execution of the instructions by a processor of a computer, cause the computer to perform:

receiving a set of pre-defined rules where the number of rules is on the order of thousands or more, each rule in the set of pre-defined rules includes one or more conditions and an action taken when the one or more conditions are satisfied;

enumerating conditions in the set of pre-defined rules for form an ordered list of conditions, where each entry in the ordered list of conditions represents one condition from the set of pre-defined rules and each condition in the ordered list of conditions depends on only one field in a given data record;

filtering conditions from the ordered list of conditions by removing conditions preceded in the ordered list of conditions by an identical condition having identical fields and values and removing conditions preceded in the ordered list of conditions by a logically complementary condition having identical fields and values;

for each given rule in the set of pre-defined rules, connecting conditions in the ordered list of conditions that are associated with a given rule by logical operators to form a transformed rule corresponding to the given rule in the set of pre-defined rules, thereby forming a set of transformed rules;

receiving a data record having one or more data fields; and evaluating the data record in relation to the set of transformed rules.

10. The non-transitory computer-readable medium of claim 9, wherein the computer program instructions further perform to receive another data record, and evaluate the another data record in relation to the set of transformed rules.

11. The non-transitory computer-readable medium of claim 9, wherein the computer program instructions further perform to process the set of transformed rules sequentially in ascending order.

12. The non-transitory computer-readable medium of claim 11, wherein the data record is evaluated in relation to the set of transformed rules by evaluating each condition in the ordered list of conditions in relation to the data record;

evaluating the logical operators in the set of transformed rules; and for each transformed rule in the set of transformed rules, executing the action associated with a given transformed rule when conditions for the given transformed rule are satisfied by the data record.

13. The non-transitory computer-readable medium of claim 12, wherein evaluating the logical operators in the set of transformed rules includes skipping select rules, where the select rules have at least one condition that is not satisfied by the data record.

14. The non-transitory computer-readable medium of claim 12, wherein the computer program instructions further perform to execute an action for a particular transformed rule that modifies value of a given data field in the data record;

re-evaluate conditions in the ordered list of conditions that depend upon the value of the given data field;

re-evaluate the logical operators in the set of transformed rules; and continue processing the set of transformed rules sequentially starting from the particular transformed rule.

15. The non-transitory computer-readable medium of claim 14, wherein the computer program instructions continue processing the set of transformed rules sequentially starting from a first transformed rule in the set of transformed rules when at least one logical operator is a negation operator.

16. The non-transitory computer-readable medium of claim 9, wherein the computer program instructions further perform to group conditions in the ordered list of conditions by data field prior to the step of evaluating the data record in relation to the set of transformed rules.

* * * * *